US007677091B2

(12) United States Patent
Mukai et al.

(10) Patent No.: US 7,677,091 B2
(45) Date of Patent: Mar. 16, 2010

(54) AIR-FUEL RATIO CONTROLLER FOR AN INTERNAL COMBUSTION ENGINE AND DIAGNOSIS APPARATUS FOR INTAKE SENSORS

(75) Inventors: Yasuo Mukai, Kariya (JP); Tetsuji Mitsuda, Ichinomiya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 12/213,932

(22) Filed: Jun. 26, 2008

(65) Prior Publication Data

US 2008/0275623 A1 Nov. 6, 2008

Related U.S. Application Data

(62) Division of application No. 11/892,296, filed on Aug. 21, 2007, which is a division of application No. 11/169,020, filed on Jun. 29, 2005, now Pat. No. 7,273, 046.

(30) Foreign Application Priority Data

| | | | |
|---|---|---|---|
| Jul. 9, 2004 | (JP) | ............................ | 2004-202637 |
| Jan. 14, 2005 | (JP) | ............................ | 2005-007143 |
| Mar. 2, 2005 | (JP) | ............................ | 2005-057584 |

(51) Int. Cl.
*G01M 15/05* (2006.01)

(52) U.S. Cl. .................................................. 73/114.37

(58) Field of Classification Search ............. 73/114.31, 73/114.32, 114.33, 114.36, 114.37, 114.77, 73/114.45, 114.48

See application file for complete search history.

(56) References Cited

U.S. PATENT DOCUMENTS

| | | | |
|---|---|---|---|
| 5,384,707 | A | 1/1995 | Kerns et al. |
| 5,698,780 | A | 12/1997 | Mizutani et al. |
| 5,714,673 | A | 2/1998 | Bidner et al. |
| 6,662,640 | B2 | 12/2003 | Yagi |
| 6,985,806 | B2 | 1/2006 | Stadler |
| 6,990,856 | B2 | 1/2006 | Dempsey et al. |
| 7,085,643 | B2 | 8/2006 | Muto et al. |
| 7,273,046 | B2 | 9/2007 | Osumi et al. |
| 2004/0079341 | A1 | 4/2004 | Fuwa |
| 2008/0004787 | A1 | 1/2008 | Mitsuda et al. |

FOREIGN PATENT DOCUMENTS

| | | |
|---|---|---|
| JP | 2004-100472 | 4/2004 |
| JP | 2004-116459 | 4/2004 |

OTHER PUBLICATIONS

Office Action issued Jan. 2, 2009 in co-pending U.S. Appl. No. 11/892,296.

*Primary Examiner*—Eric S McCall
(74) *Attorney, Agent, or Firm*—Nixon & Vanderhye P.C.

(57) ABSTRACT

A computer calculates an estimated cylinder-intake-air amount based on outputs from an airflow meter and a throttle position sensor, and then calculates a reference cylinder-intake-air amount based on an air-fuel ratio in an exhaust gas and fuel injection amount. An error of the estimated cylinder-intake-air amount is calculated by comparing the reference cylinder-intake-air amount with an estimated cylinder-intake-air amount base value. The error is low-pass filtered. The estimated cylinder-intake-air amount base value is corrected to obtain the final estimated cylinder-intake-air amount.

5 Claims, 18 Drawing Sheets

AIR-FUEL RATIO CONTROLLER FOR AN INTERNAL COMBUSTION ENGINE AND DIAGNOSIS APPARATUS FOR INTAKE SENSORS

CROSS REFERENCE TO RELATED APPLICATIONS

This application is a divisional of U.S. patent application Ser. No. 11/892,296 filed Aug. 21, 2007, which in turn is a divisional of U.S. patent application Ser. No. 11/169,020 (now U.S. Pat. No. 7,273,046) filed Jun. 29, 2005. This application is based on and incorporates herein by reference Japanese Patent Applications No. 2004-202637 filed on Jul. 9, 2004, No. 2005-7143 filed on Jan. 14, 2005 and No. 2005-57584 filed on Mar. 2, 2005, the disclosure of which are incorporated herein by reference.

FIELD OF THE INVENTION

The present invention relates to an air-fuel controller for an internal combustion engine and a diagnosis apparatus for intake sensors. The internal combustion engine is equipped with a function in which a fuel injection amount is calculated based on an estimated cylinder-intake-air amount according to an open-loop air-fuel ratio control. The diagnosis apparatus detects a malfunction of intake sensors such as an intake air amount sensor and an intake pipe pressure sensor.

BACKGROUND OF THE INVENTION

JP-2002-130042A shows a method of calculation of an estimated cylinder-intake-air amount, which is adopted in an open-loop air-fuel ratio control. The estimated cylinder-intake-air amount is calculated based on an output from an airflow sensor according to an intake-air-system model simulating a behavior of the intake air flowing from a throttle valve to a cylinder. However, when an error (a model error) of the estimated cylinder-intake-air amount is increased due to a dispersion in producing the system and a deterioration with age, the error is hardly compensated. Thus, when the method described above is adopted in the open-loop fuel ratio control, a robustness thereof may be deteriorated.

U.S. Pat. No. 5,384,707 shows a diagnostic method of an intake air amount sensor in which a diagnosis is conducted by comparing an intake air amount calculated based on an output of a throttle position sensor and an engine speed, an intake air amount detected by an airflow meter, and an intake air amount calculated based on an air-fuel ratio of exhaust gas detected by air-fuel ratio sensor and a fuel injection amount. The intake air amount calculated based on the throttle position and the engine speed is referred to as a throttle-base intake air amount hereinafter.

Dust in the intake air may adhere on a throttle valve. As the dust adhering on the throttle valve, which is referred to as a deposit, increases, the air passing through the throttle valve is decreased even if the throttle position is not changed, so that the calculating error of the throttle-base intake air amount increases.

Thus, in the system where the diagnosis for the intake air amount sensor is conducted based on the throttle-base intake air amount, it may erroneously diagnoses that the intake air amount sensor has malfunctions even though the intake air amount sensor is normal when the amount of deposit is increased.

When the diagnostic method described in U.S. Pat. No. 5,384,707 is applied to the system where the intake air amount is calculated based on the intake pipe pressure detected by the intake pipe pressure sensor in order to determine the fuel injection amount, the malfunction of the intake air pipe pressure sensor is conducted by comparing the intake air amount calculated based on the output from the intake air pipe pressure sensor, the throttle-base intake air amount, and the intake air amount calculated based the air-fuel ratio and the fuel injection amount. However, when the deposit on the throttle valve is increased, the normal intake pipe pressure sensor may be determined as the sensor having malfunctions due to the calculating error of the throttle-base intake air amount.

SUMMARY OF THE INVENTION

The present invention is made in view of the foregoing matter and it is an object of the present invention to provide an air-fuel ratio controller for an engine which can compensate the error of the estimated cylinder-intake-air amount in open-loop air-fuel ratio controlling and can enhance the accuracy of calculating the estimated cylinder-intake-air amount and the robustness of the open-loop air-fuel ratio control. It is another object of the present invention to provide a diagnosis apparatus for intake air sensors, such as the intake air amount sensors and the intake pipe pressure sensors, which prevents the determination in which a normal sensor has the malfunction.

According to an exemplary embodiment of the present invention, an air-fuel ratio controller for an internal combustion engine includes a cylinder-intake-air amount estimating means for estimating a cylinder-intake-air amount, and performs an open-loop air-fuel ratio control to calculate a fuel injection amount based on the cylinder-intake-air amount estimated by the cylinder-intake-air amount estimating means. And, the controller includes comprises an air-fuel ratio detecting means for detecting an air-fuel ratio in an exhaust gas of the internal combustion engine, a reference cylinder-intake-air amount calculating means for calculating a reference cylinder-intake-air amount based on the air-fuel ratio detected by the air-fuel ratio detecting means and the fuel injection amount, and a correction means for collecting the estimated cylinder-intake-air amount based on the reference cylinder-intake-air amount.

According to another aspect of the invention, a diagnosis apparatus for intake sensors comprises an intake air amount sensor detecting an amount of intake air of an internal combustion engine, an intake pipe pressure sensor detecting an intake pipe pressure, a throttle position sensor detecting a position of a throttle valve; and a diagnosis means for performing a diagnosis of an intake air amount sensor by conducting a comparison between an intake air amount information obtained by the intake air amount sensor and an intake air amount information obtained by the throttle position sensor, and/or performing a diagnosis of intake pipe pressure sensor by conducting a comparison between an intake air amount information obtained by the intake pipe pressure sensor and an intake air amount information obtained by the throttle position sensor. The diagnosis means performs the diagnosis when a comparison result between the intake air amount information obtained by the intake air amount sensor and the intake air amount information obtained by the intake pipe pressure sensor satisfies a predetermined condition.

According to another aspect of the invention, a diagnosis apparatus for intake sensors comprises an intake air amount sensor detecting an amount of intake air of an internal combustion engine, an intake pipe pressure sensor detecting an intake pipe pressure, an air-fuel ratio sensor detecting air-fuel ratio in an exhaust gas; and a diagnosis means for performing a diagnosis of the intake air amount sensor and/or the intake pipe pressure sensor. The diagnosis means performs the diagnosis by comparing a first intake air amount representing an intake air amount detected by the intake air amount sensor, a second intake air amount representing an intake air amount calculated based on an intake pipe pressure detected by the intake pipe pressure sensor, and a third intake air amount representing an intake air amount calculated based on the air-fuel ratio and a fuel injection amount.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

Figure 1:
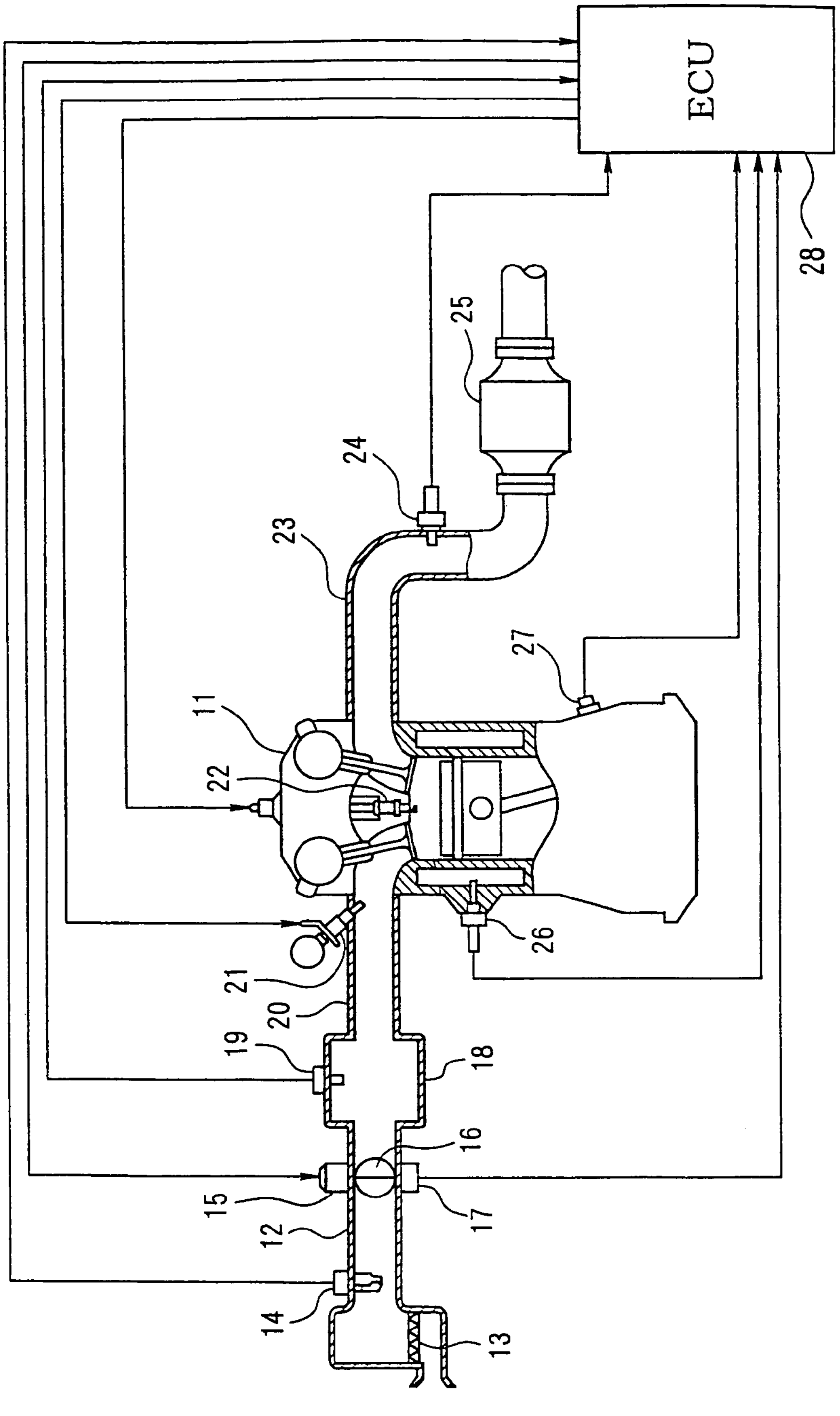
FIG. 1 is schematic view of an engine control system according to a first embodiment of the present invention.

An embodiment of the present invention will be described hereinafter with reference to the drawings.

First Embodiment

Referring to FIGS. 1 to 4, the first embodiment described hereinafter. An air cleaner 13 is disposed at most upstream portion of an intake air pipe 12 of the engine 11. An airflow meter 14 (an intake air amount detecting means) detecting an intake air mount is disposed downstream of the air cleaner 13. A throttle valve 16 driving a motor 15 and a throttle position sensor 17 detecting the position of the throttle valve 16 are disposed downstream of the airflow meter 14.

A surge tank 18 is arranged downstream of the throttle valve 16. An intake air pipe pressure sensor 19 is disposed in the surge tank 18 to detect the intake air pipe pressure. The surge tank 18 is connected with an intake manifold 20 for introducing the intake air into each cylinder of the engine 11. A fuel injector 21 is mounted at the vicinity of an intake air port of the intake manifold 20 corresponding to each cylinder. A spark plug 22 is mounted on the cylinder head of the engine 11 corresponding to each cylinder. An air-fuel mixture in each cylinder is ignited by the spark plug 22.

A three-way catalyst 25 for purifying CO, HC, and NOx in the exhaust gas is disposed in the exhaust pipe 23 of the engine 11. An air-fuel ratio sensor 24 (air-fuel ratio detecting means) detecting an air-fuel ratio in the exhaust gas is disposed upstream of the three-way catalyst 25.

A coolant temperature sensor 26 detecting a temperature of coolant for the engine, and a crank angle sensor 27 outputting a pulse signal every predetermined crank angle of the crankshaft of the engine 11 are disposed on a cylinder block of the engine 11. The crank angle sensor 27 detects the crank angle and the engine speed.

The outputs from the sensors are inputted into an electric control unit 28, which is referred to as an ECU 28 hereinafter. The ECU 28 mainly comprises a microcomputer, which controls the fuel injection amount by the fuel injector 21 and an ignition timing of the spark plug 22 according to an engine driving condition by processing engine control programs stored in an onboard ROM (Read Only Memory).

The ECU 28 performs the open-loop air-fuel ratio control in order to calculate a fuel injection amount "Fuel" based on the estimated cylinder-intake-air amount "Aest". In performing the open-loop air-fuel ratio control, an air-fuel ratio feedback control can be performed to correct the fuel injection amount "Fuel" in such a manner that the air-fuel ratio "A/F" in the exhaust gas detected by the air-fuel ratio sensor 24 coincides with a target air-fuel ratio.

Figure 2:
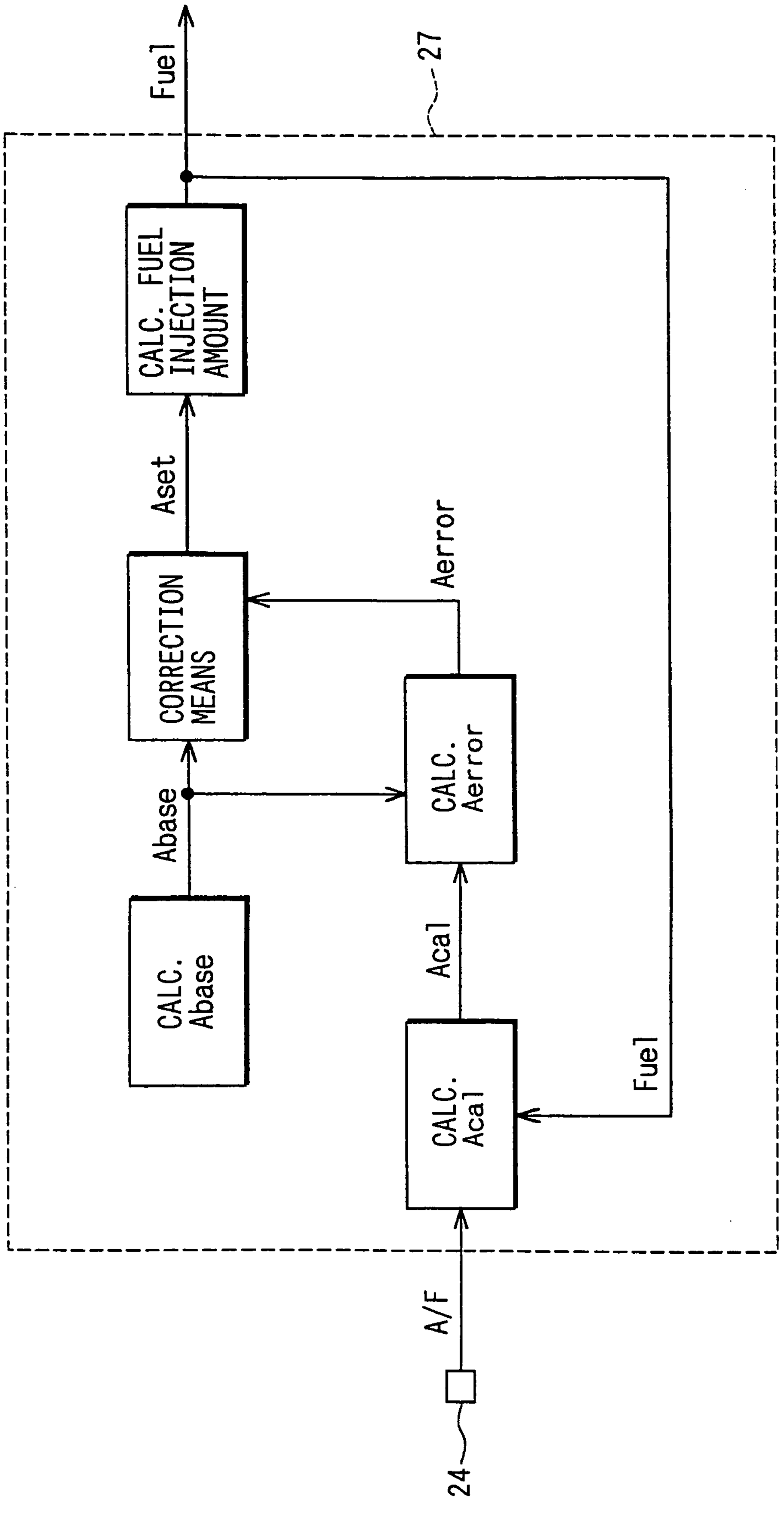
FIG. 2 is a block chart for explaining a function of an open-loop air-fuel ratio control according to the first embodiment.
Figure 3:
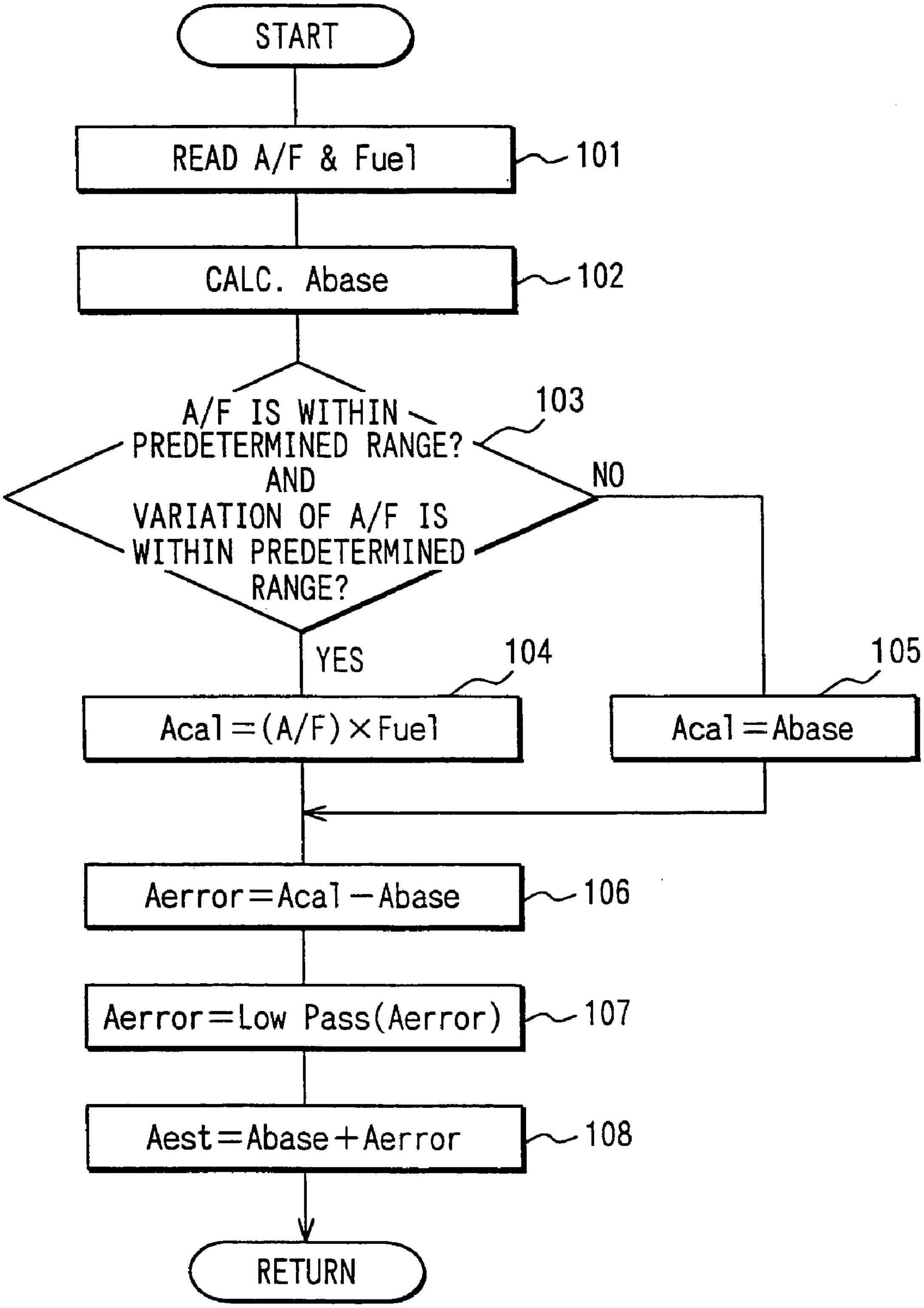
FIG. 3 is a flowchart showing an estimated cylinder-intake-air amount calculating routine.

The ECU 28 calculates the estimated cylinder-intake-air amount "Aest" by performing an estimated cylinder-intake-air amount calculating program shown in FIG. 3. As shown in FIG. 2, an estimated cylinder-intake-air amount base vale "Abase" is calculated based on outputs from the airflow meter 14 and the throttle position sensor 17. A reference cylinder-intake-air amount "Acal" is calculated based on the air-fuel ratio "A/F" and the fuel injection amount "Fuel". An error "Aerror" of the estimated cylinder-intake-air amount is derived by comparing the reference cylinder-intake-air amount "Acal" with the estimated cylinder-intake-air amount base vale "Abase", and then a low-pass filtering is performed with respect to the error "Aerror". The base vale "Abase" is corrected by an amount corresponding to the error "Aerror" to obtain the final estimated cylinder-intake-air amount "Aest".

Referring to FIG. 3, processes of the estimated cylinder-intake-air amount calculating program are described hereinafter.

The program shown in FIG. 3 is periodically performed while the engine is running. In step 101, the air-fuel ratio "A/F" and the fuel injection amount "Fuel" are read. In step 102, the base vale "Abase" is calculated based on the outputs from ht airflow meter 14 and the throttle position sensor 17 according to an intake air system model which simulates the behavior of the intake air. The process in step 102 functions as a cylinder-intake-air amount estimating means.

Then, the procedure proceed to step 103, in which the computer determines whether it is in a stable driving condition in which the air-fuel ratio "A/F" is within a range keeping a detecting accuracy of the air-fuel ratio sensor 24 (a range relatively close to a stoichiometric air-fuel ratio) high and a variation of the air-fuel ratio "A/F" is small according to whether the air-fuel ratio "A/F" is within a predetermined range and a variation of the air-fuel ratio "A/F" per a preset period is within a predetermined range.

When the air-fuel ratio "A/F" is out of the range, the calculation accuracy of the reference cylinder-intake-air amount "Acal" is deteriorated. Since there are time delays until the variation of the actual cylinder-intake-air amount and the variation of the actual air-fuel ratio appear as the variation in the detected air-fuel ratio "A/F", the calculating accuracy of the reference cylinder-intake-air amount "Acal" is deteriorated. Thus, when it is the stable driving condition, the calculating accuracy of the reference cylinder-intake-air amount "Acal" is kept high.

In step 103, when the computer determines that it is in the stable driving condition, the procedure proceeds to step 104 in which the reference cylinder-intake-air amount "Acal" is calculated based on the air-fuel ratio "A/F" and the fuel injection amount "Fuel" according to the following equation.

$$Acal=(A/F)\times Fuel$$

Since the air-fuel ratio "A/F" is varied according to the actual cylinder-intake-air amount and the fuel injection amount "Fuel", the reference cylinder-intake-air amount precisely reflecting the actual cylinder-intake-air amount can be calculated. The process in step 104 functions as a reference cylinder-intake-air amount calculating means.

In step 103, the computer determines that the air-fuel ratio "A/F" is out of the range in which the detecting accuracy of the air-fuel sensor 24 is kept high, or that it is in a transient driving condition, the procedure proceeds to step 105 in which the estimated cylinder-intake-air-amount base value "Abase" is considered as the reference cylinder-intake-air amount "Acal"

$$Acal=Abase$$

Then, the procedure proceeds to step 106 in which the base value "Abase" is subtracted from the reference cylinder-intake-air amount "Acal" to obtain the error "Aerror" of the estimated cylinder-intake-sir amount.

$$Aerror=Acal-Abase$$

Then, the procedure proceeds to step 107 in which the low-pass filtering is performed with respect to the error "Aerror" of the estimated cylinder-intake-air amount. In step 108, the estimated cylinder-intake-air amount is corrected by an amount corresponding to the error "Aerror" to obtain the final estimated cylinder-intake-sir amount "Aest".

$$Aest=Abase+Aerror$$

The process in step 108 corresponds to a correction means.

Figure 4A:
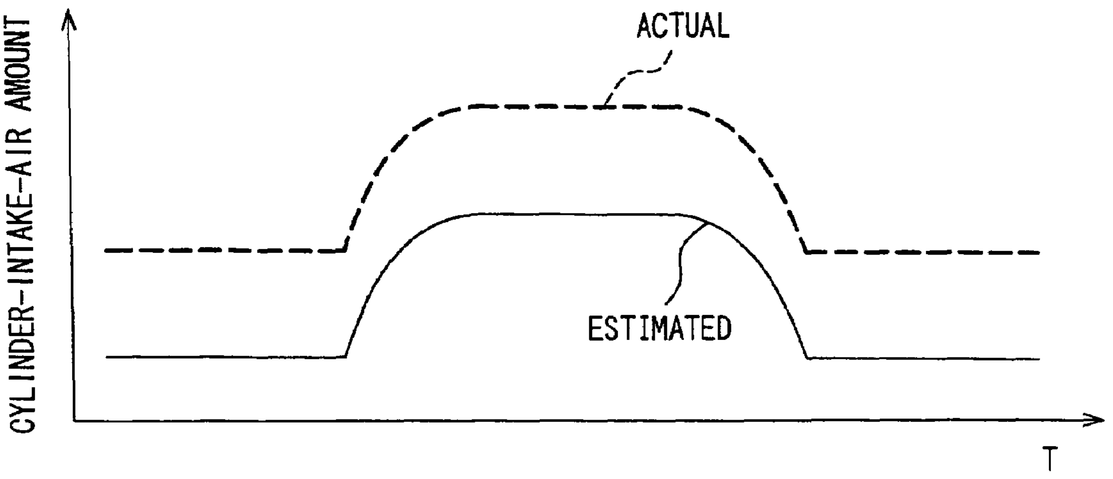
FIG. 4A PRIOR ART
FIG. 4A is a graph showing an effect of a conventional system.
Figure 4B:
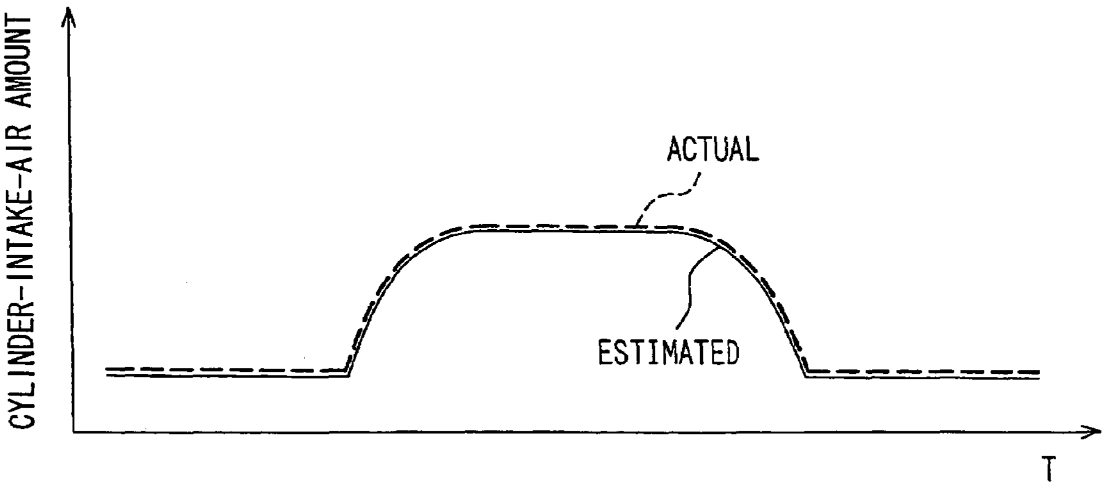
FIG. 4B is a graph showing an effect of the first embodiment.

Conventionally, as shown in FIG. 4A, the deterioration of the calculating accuracy of the estimated cylinder-intake-air amount causes the deterioration of the robustness of the open-loop air-fuel ratio control because the error of the estimated cylinder-intake-air amount is not compensated.

According to the first embodiment, the estimated cylinder-intake-air amount "Aest" can be close to the actual cylinder-intake-air amount by compensating the error of the estimated cylinder-intake-air-amount. Thus, the calculating accuracy of the estimated cylinder-intake-air amount "Aest" is enhanced so that the robustness of the open-loop air-fuel ratio control is also enhanced. Furthermore, the calculating accuracy of the reference cylinder-intake-air amount "Acal" is certainly kept high.

Second Embodiment

Figure 5:
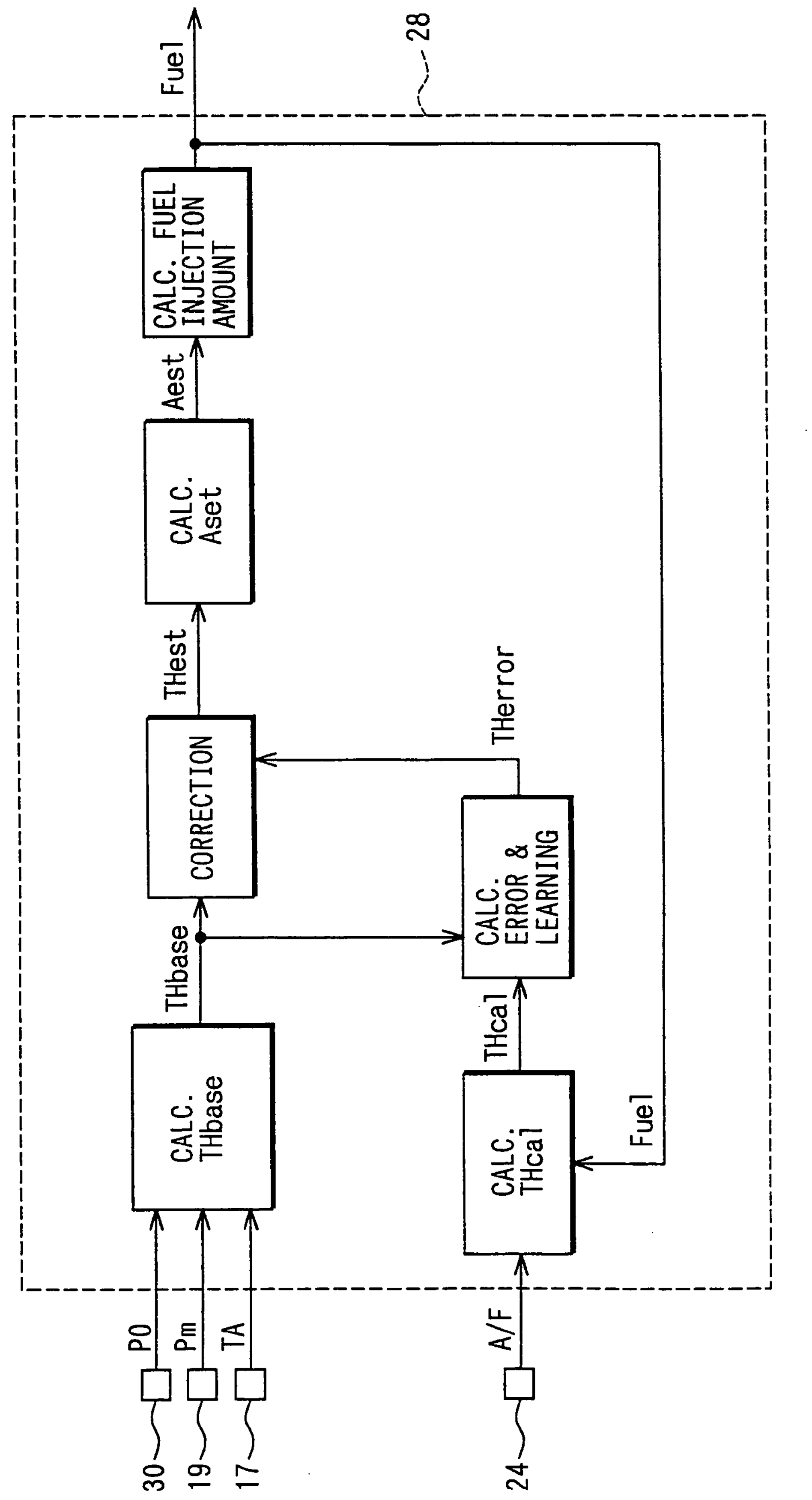
FIG. 5 is a block chart for explaining a function of an open-loop air-fuel ratio control according a second embodiment.
Figure 6:
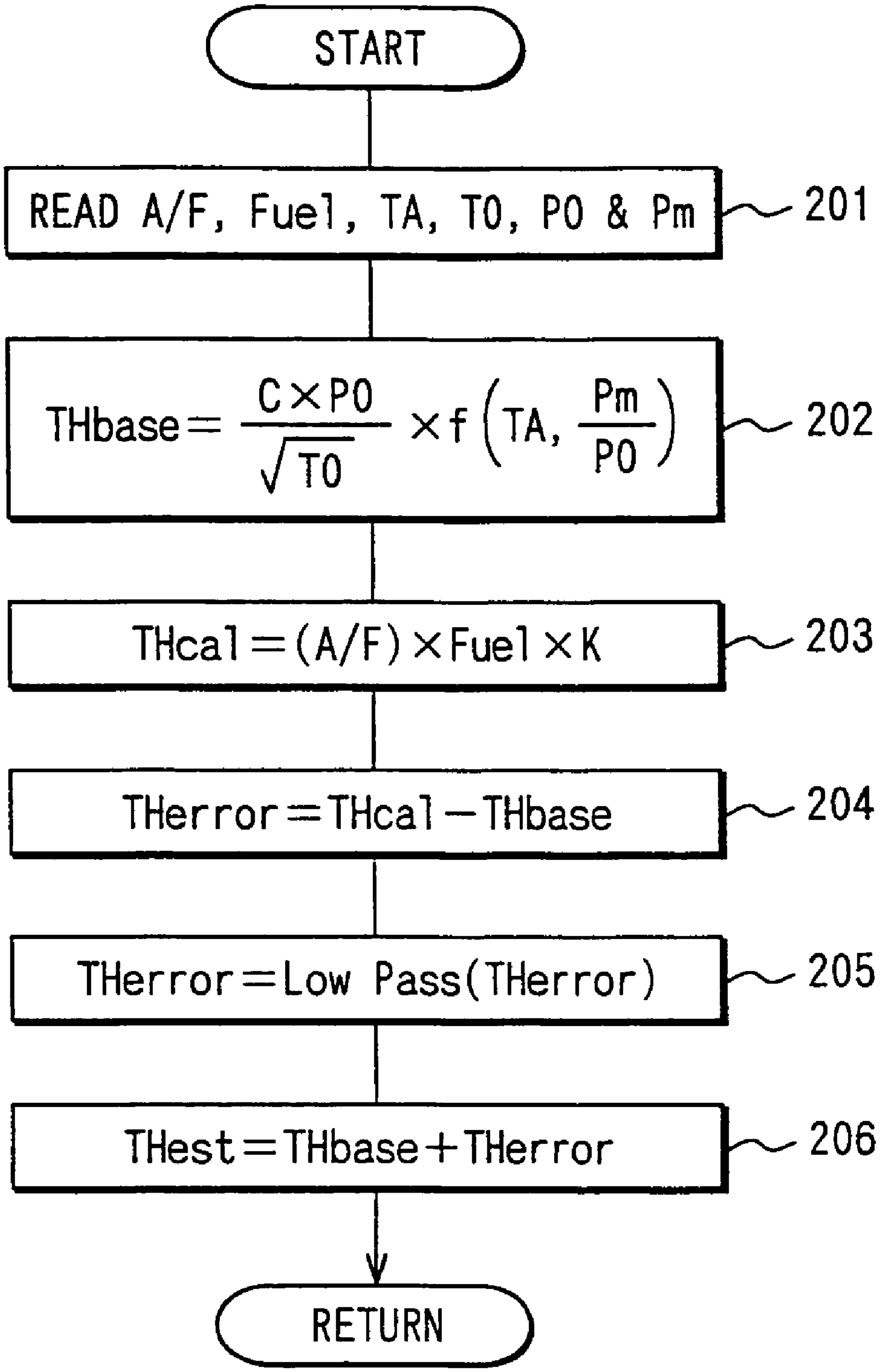
FIG. 6 is a flowchart showing an estimated throttle-passing-air amount calculating routine.

Referring to FIGS. 5 and 6, the second embodiment is described. As shown in FIG. 5, an open-loop air-fuel ratio control is performed, in which an estimated throttle-passing-air amount "THest" is calculated, and then the fuel injection amount "Fuel" is calculated based on the estimated cylinder-intake-air amount "Aest" derived based on the estimated throttle-passing-air amount "THest".

The ECU 28 performs the estimated throttle-passing-air amount calculating program shown in FIG. 6 to calculate the estimated throttle-passing-air amount. As shown in FIG. 5, the estimated throttle-passing-air amount base value "THbase" is calculated based on the atmospheric pressure, which is referred to as a throttle upstream pressure "P0", detected by a atmospheric pressure sensor 30, a throttle downstream pressure "Pm" detected by the intake pipe pressure sensor 19, and a throttle position "TA" detected by the throttle position sensor 17, and then a reference throttle-passing-air amount "THcal" is calculated based on the air-fuel ratio "A/F" detected by the air-fuel ratio sensor 24 and the fuel injection amount "Fuel". The error "THerror" of the estimated throttle-passing-air amount is derived by comparing the reference throttle-passing-air amount "THcal" and the estimated throttle-passing-air amount base value "THbase", and then the low-pass filtering is performed with respect to the error "THeror". Then, the base value "THbase" is corrected by an amount corresponding to the error "THerror" to obtain the final estimated throttle-passing-air amount "THest".

Referring to FIG. 6, the process of the estimated throttle-passing-air amount calculating program performed by the ECU 28 is described hereinafter. In step 201, the air-fuel ratio "A/F", the fuel injection amount "Fuel", the throttle position "TA", the throttle upstream pressure "P0", and the throttle downstream pressure "Pm" are read.

In step 202, the estimated throttle-passing-air amount base value "THbase" is calculated based on the throttle position "TA" and a pressure ratio (Pm/P0) between upstream and downstream of the throttle valve. This calculation is conducted according to the following equation (1).

$$THbase=\frac{c\times P0}{\sqrt{T0}}\times f\left(TA,\ \frac{Pm}{P0}\right) \tag{1}$$

The process in step 202 functions as a throttle-passing-air amount estimating means.

Then, procedure proceeds to step 203 in which the reference throttle-passing-air-amount "THcal" is calculated based on the air-fuel ratio "A/F", the fuel injection amount "Fuel", and the coefficient K according to the following equation.

$$THcal=(A/F)\times Fuel\times K$$

Since the air-fuel ratio "A/F" is varied according to the actual throttle-passing-air amount and the fuel injection amount "Fuel", the reference throttle-passing-air amount precisely reflecting the actual throttle-passing-air amount can be calculated. The process in step 203 functions as a reference throttle-passing-air amount calculating means.

Then, the procedure proceeds to step 204 in which the estimated throttle-passing-air amount base value "THbase" is subtracted from the reference throttle-passing-air amount to obtain the error "THerror".

$$THerror = THcal - THbase$$

Then, procedure proceeds to step 205 in which the low-pass filtering performed with respect to the error "THerror" of the estimated throttle-passing-air amount and the error "THerror" is learned as following steps.

A map of error learning value "THerror" is stored in a nonvolatile memory such as a backup RAM of the ECU 28. This map is divided in to a plurality of regions having parameters of throttle position "TA" and the pressure ratio (Pm/P0). In every region, the error learning value "THerror" is respectively stored. The error learning value "THerror" is updated by the error "THerror".

Then, the procedure proceeds to step 206 in which a map of the error learning value "THerror" is selected to read the error learning value "THerror" corresponding to the present throttle position "TA" and the pressure ratio (Pm/P0). The final estimated throttle-passing-air amount "THest" is derived by correcting the base value "THbase" based on the error learning value "THerror".

$$THest = THbase + THerror$$

According to the second embodiment, the error of the estimated throttle-passing-air amount can be compensated. Thus, the error of the estimated cylinder-intake-air amount based on the estimated throttle-passing-air amount can be compensated, so that the calculating accuracy of the estimated cylinder-intake-air amount "Aest" and the robustness of the open-loop air-fuel ratio control are enhanced.

Furthermore, according to the second embodiment, since the error "THerror" of the estimated throttle-air-passing amount is learned at every learning region which is divided according to the throttle position "TA" and the pressure ratio (Pm/P0), the accuracy of the correction of the estimated throttle-passing-air amount is enhanced.

Third Embodiment

Figure 7:
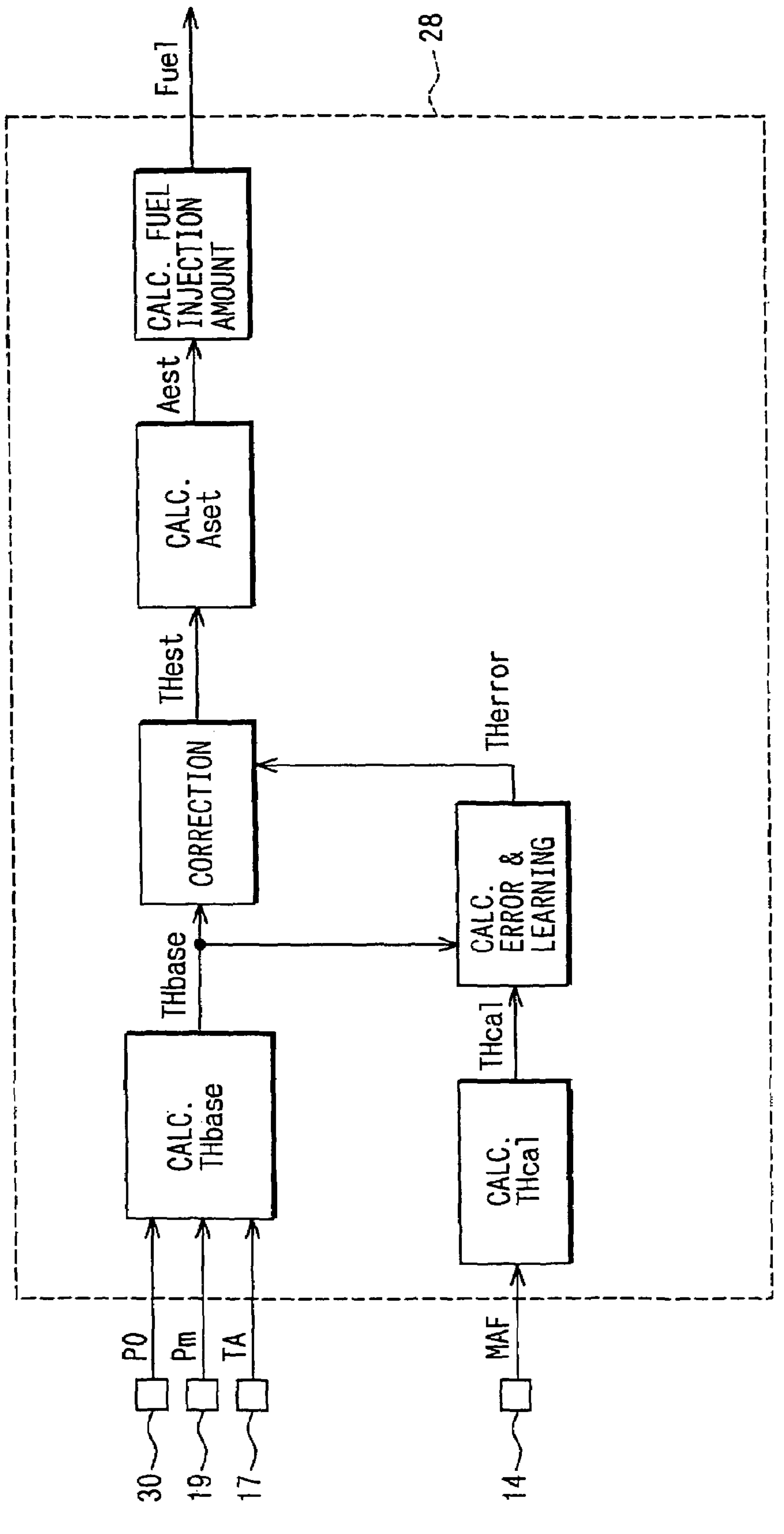
FIG. 7 is a block chart for explaining a function of an open-loop air-fuel ratio control according to a third embodiment.
Figure 8:
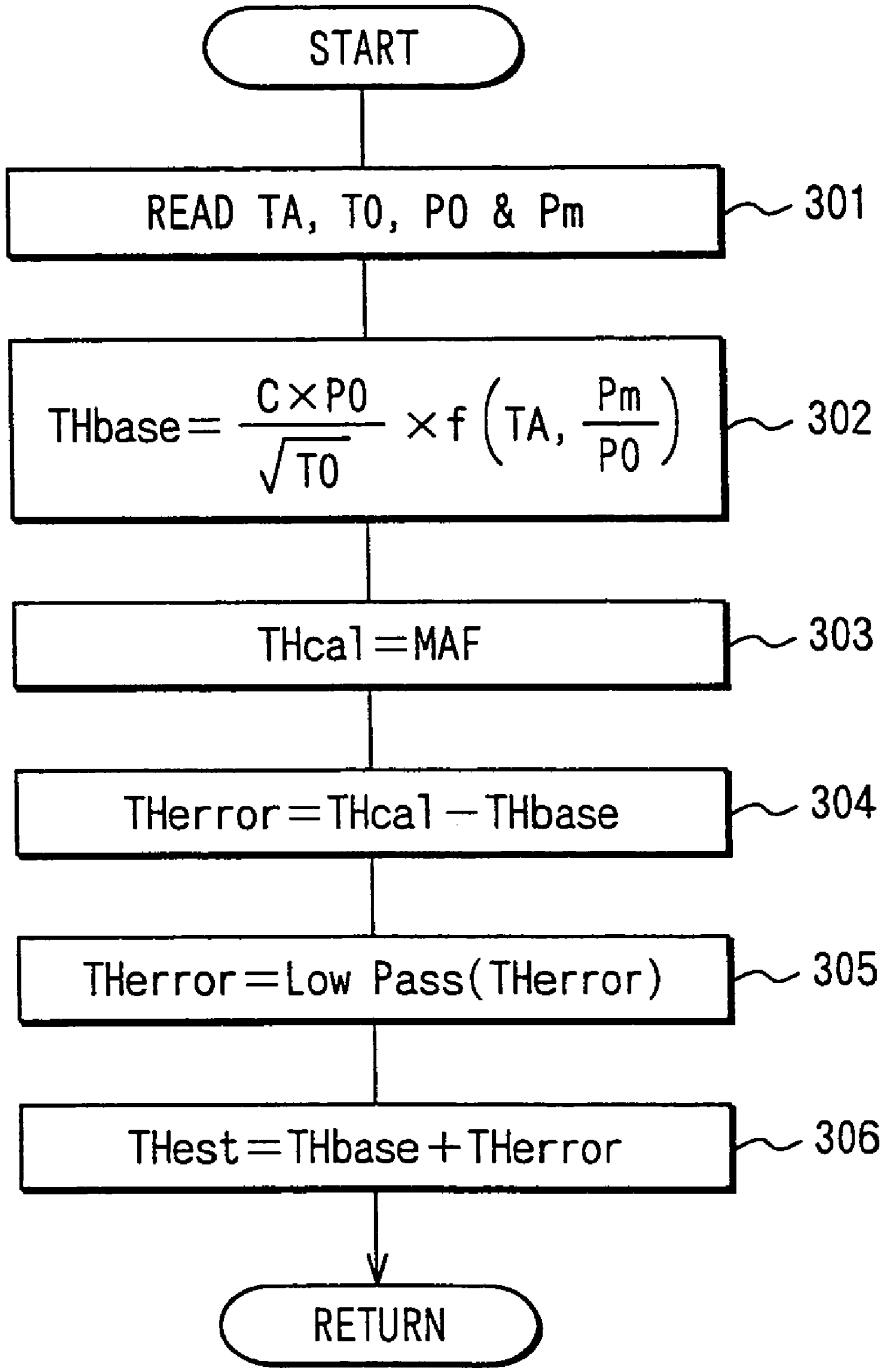
FIG. 8 is a flowchart showing an estimated throttle-passing-air amount according to the third embodiment.

Referring to FIGS. 7 and 8, a third embodiment is described hereinafter.

As shown in FIG. 7, an intake air amount "MAF" detected by the airflow meter 14 is adopted as the reference throttle-passing-air amount "THcal". The estimated throttle-passing-air amount is corrected based on the reference throttle-passing-air amount "THcal".

According to the third embodiment, the program shown in FIG. 8 is performed. In step 301, the computer reads the throttle position "TA", the throttle upstream pressure "P0", and the throttle downstream pressure "Pm". In step 302, the estimated throttle-passing-air amount base value "THbase" is calculated based on the throttle position "TA" and the pressure ratio (Pm/P0) according to the above equation (1).

Then, the procedure proceeds to step 303 in which the intake air amount "MAF" detected by the airflow meter 14 is adopted as the reference throttle-passing-air amount.

$$THcal = MAF$$

In step 304, the base value "THbase" is subtracted from the reference throttle-passing-air amount "THbase" to obtain the error "THerror" of the estimated throttle-passing-air amount.

$$THerror = THcal - THbase$$

Then, the procedure proceeds to step 305, in which the low-pass filtering is performed with respect to the error "THerror" of the estimated throttle-passing-air amount, and then the error learning value "THerror" is updated by the error "THerror" of the present estimated throttle-passing-air amount.

Then, the procedure proceeds to step 306, the base value "THbase" is corrected by the error learning value "THerror" to obtain the final estimated throttle-passing-air amount "THest".

$$THest = THbase + THerror$$

According to the third embodiment, the error of the estimated throttle-air-passing amount can be compensated to achieve the substantially same effect as the second embodiment.

When the air-fuel ratio "A/F" is within the range keeping the detecting accuracy of the air-fuel ratio sensor 24 high and the variation amount of the air-fuel ratio "A/F" per a preset period is within a predetermined range, the reference throttle-passing-air amount "THcal" can be calculated based on the air-fuel ratio "A/F" and the fuel injection amount "Fuel". When this condition is not established, the intake air amount "MAF" detected by the airflow meter 14 can be adopted as the reference throttle-passing-air amount "THcal".

Fourth Embodiment

Figure 9:
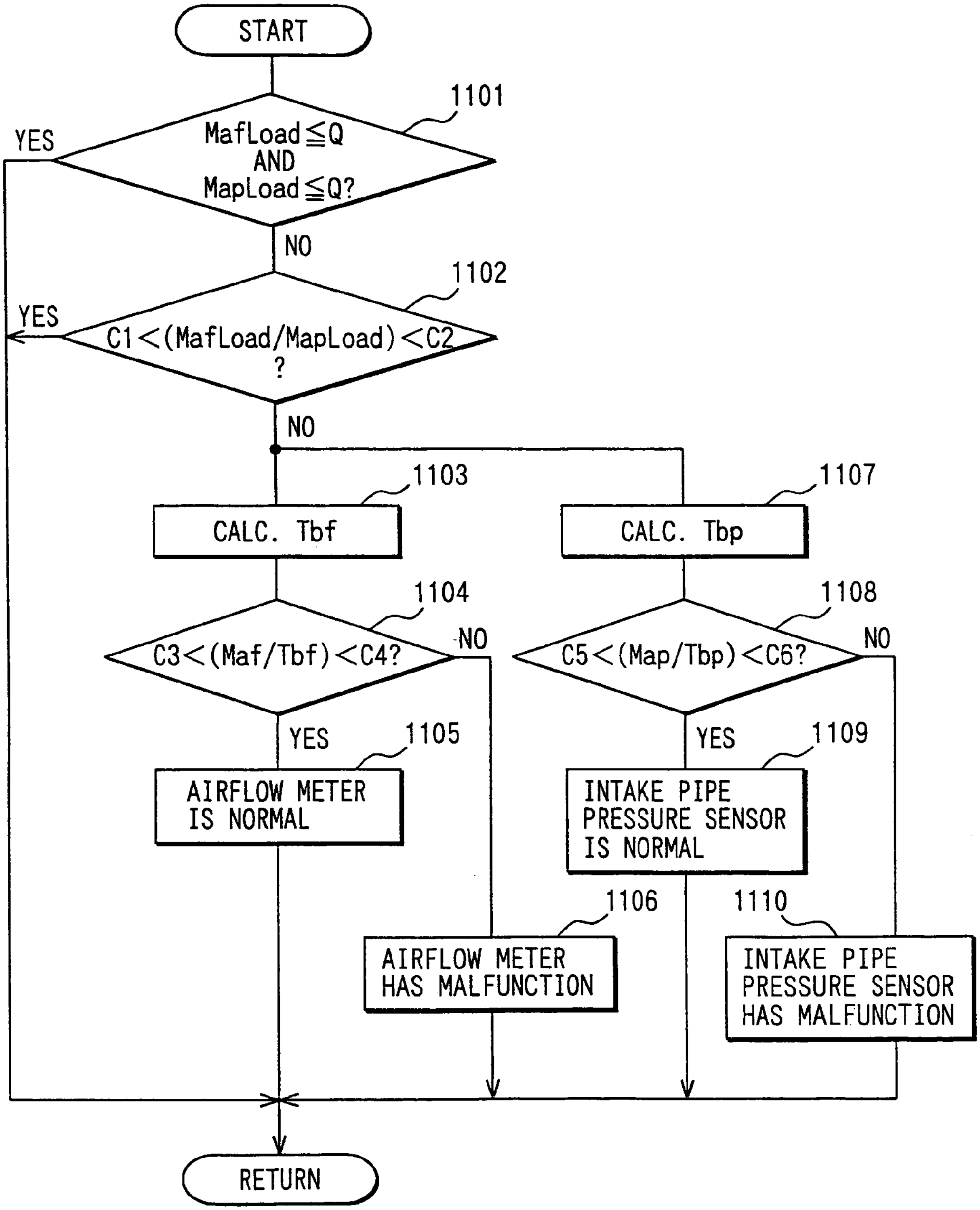
FIG. 9 is a flowchart showing a diagnosis program of intake sensors according to the fourth embodiment.

The ECU 28 performs the diagnosis program shown in FIG. 9 to conduct a diagnosis of the airflow meter and the intake pipe pressure sensor.

In the diagnosis of the airflow meter 14, the computer determines whether a malfunction exists in the airflow meter 14 according to whether a ratio (MAF/Tbf) between the intake air amount "MAF" [g/s: mass flow rate per a second] calculated based on the output of the airflow meter 14 and the throttle-base intake air amount "Tbf" [g/s] is within a normal range including "1". The throttle-base intake air amount "Tbf" is calculated based on the throttle position and the engine speed. The normal range is from "C3" to "C4", wherein "C3"<1, "C4">1.

In the diagnosis of the intake pipe pressure sensor, the computer determines whether a malfunction exists in the intake pipe pressure sensor 19 according to whether a ratio (Map/Tbf) between the intake pipe pressure "Map" and the throttle-base intake air pressure "Tbp" calculated based on the throttle position and the engine speed is within a normal range including "1". The normal range is from "C5" to "C6", wherein "C5"<1, "C6">1.

When the deposit on the throttle valve 16 increases to increase a deviation between the throttle-base intake air amount "Tbf" and the detected intake air amount "MAF", it may erroneously determines that the normal airflow meter 14 has a malfunction. And it may erroneously determine that the normal intake pipe pressure sensor 19 has a malfunction.

In view of the foregoing matter, the ECU 28 determines whether both the airflow meter 14 and the intake pipe pressure sensor 19 are normal according to whether a ratio (MafLoad/MapLoad) is within a normal range including "1". The ratio (MafLoad/MapLoad) is a ratio between an intake air amount "MafLoad" [g/rev: mass flow rate per one revolution] calculated based on the output from the airflow meter 14 and the engine speed, and an intake air amount "MapLoad" [g/rev] calculated based on the output form the intake pipe pressure sensor 19 and the engine speed. The ratio (MafLoad/MapLoad) is from "C1" to "C2", wherein "C1"<1, "C2">1. Only when it is determined that at least one of the airflow meter 14 and the intake pipe pressure sensor 19 has malfunction, the airflow meter diagnosis and the intake pipe pressure sensor diagnosis are performed. When the both the airflow meter 14 and the intake pipe pressure sensor 19 are normal, the diagnosis of the airflow meter and the intake pipe pressure sensor are prohibited.

Thus, it is prevented from determining airflow meter 14 and/or the intake pipe pressure sensor 19 has malfunction even though they are normal.

Referring to FIG. 9, the process of the intake sensor diagnosis program is described hereinafter. The program shown in FIG. 9 is periodically performed while the ECU 28 is ON, and functions as an intake sensor diagnosis means. In step 1101, the computer determines whether it is in a low intake air amount region according to whether both the intake air amounts "AafLoad" and "MapLoad" are lower than a predetermined amount "Q".

The predetermined amount "Q" is defined as an intake air amount in which output deference between normal outputs and outputs indicative of malfunction from the airflow meter 14 and the intake pipe pressure sensor 19 decreases to deteriorate the diagnostic accuracy of the airflow meter and the intake pipe pressure sensor.

It can be determined whether it is in the low intake air amount region according to whether at least one of the intake air amount "MafLoad" and the intake air amount "MapLoad" is lower than the predetermined amount "Q".

When the computer determines that it is in the low intake air amount region in step 1101, the procedure ends to prohibit the diagnosis of the airflow meter and the intake pipe pressure sensor.

When it is No in step 1101, the procedure proceeds to step 1102 in which it is determined whether the both airflow meter 14 and the intake pipe pressure sensor 19 are normal according to whether the ratio (MafLoad/MapLoad) is within the normal range, that is, "C1"<(MafLoad/MapLoad)<"C2". The value "C1" is slightly smaller than "1", and the value "C2" is slightly larger than "1".

When it is determined that both airflow meter 14 and the intake pipe pressure sensor 19 are normal, the procedure ends to prohibit the diagnosis. Thus, erroneous diagnosis is prevented.

When it is determined that at least one of the airflow meter 14 and the intake pipe pressure sensor 19 has a malfunction in step 1102, the diagnosis of the airflow meter (step 1103-step 1106) and the diagnosis of the intake pipe pressure sensor (step 1107-1110) are performed as described below.

Figure 10:
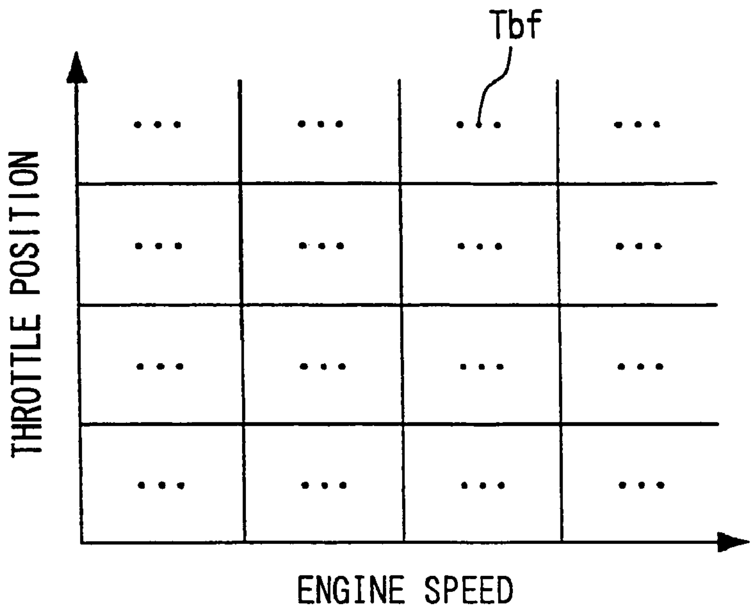
FIG. 10 is a schematic map of a throttle-base intake air amount.

In step 1103, the throttle-base intake air amount "Tbf" is calculated according to the present throttle position and the engine speed referring to a map of throttle-base intake air amount "Tbf", which is shown in FIG. 10. This map is formed based on a relation between the throttle position and the engine speed, which are derived from experimental data and design data, and is stored in the ROM of the ECU 28.

Then, the procedure proceeds to step 1104 in which it is determined whether the ratio (Maf/Tbf) is within the normal range, that is, "C3"<(Maf/Tbf)<"C4". The value of "C3" is slightly smaller than "1", and the value of "C4" is slightly larger than "1".

When it is determined that the ratio (Maf/Tbf) is within the normal range, the procedure proceeds to step 1105, in which it is determined the airflow meter 14 has no malfunction.

When it is determined that the ratio (Maf/Tbf) is out of the normal range, the procedure proceeds to step 1106, in which it is determined the airflow meter 14 has no malfunction.

Figure 11:
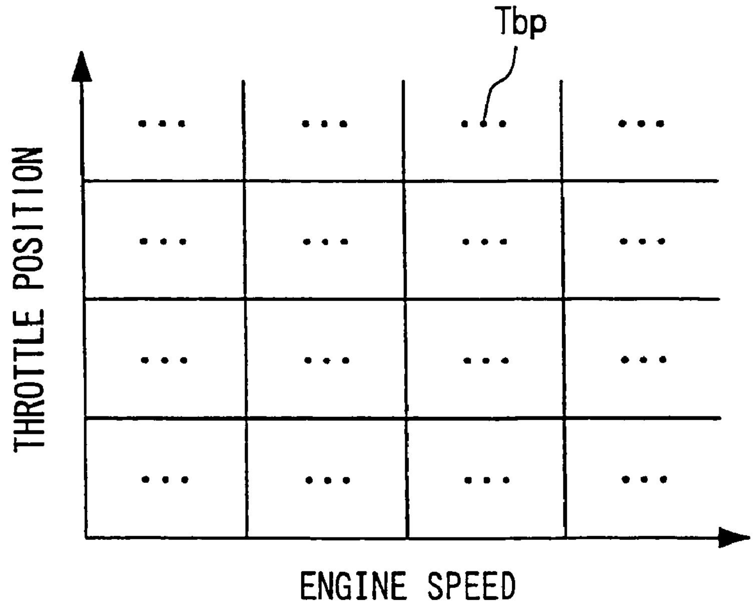
FIG. 11 is a schematic map of a throttle-base intake pipe pressure.

In step 1107, the throttle-base intake pipe pressure "Tbp" is calculated according to the present throttle position and the engine speed referring to a map of the throttle-base intake pipe pressure "Tbp", which is shown in FIG. 11. This map of the throttle-base intake pipe pressure is formed based on the relation between the throttle position and the engine speed, which are derived from experimental data and design data, and is stored in the ROM of the ECU 28.

Then, the procedure proceeds to step 1108 in which it is determined whether the ratio (Map/Tbp) between the intake pipe pressure "Map" and the throttle-base intake pipe pressure "Tbp" is within the normal range, that is, "C5"<(Map/Tbp)<"C6". The value of "C5" is slightly smaller than "1", and the value of "C6" is slightly larger than "1".

When it is determined No in step 1108, the procedure proceeds to step 1109 to determine that the intake pipe pressure sensor 19 has no malfunction (normal).

When it is determined the airflow meter 14 has a malfunction in step 1106 and/or when it is determined the intake pipe pressure sensor 19 has a malfunction in step 1110, an alarm lump (not shown) or an alarm indicator provided on an instrument panel of the vehicle is turned on to alarm the driver. This malfunctional information such as a malfunctional code is stored in the backup RAM of the ECU 28.

According to the present embodiment, the diagnostic accuracy of the airflow meter 14 and the intake pipe pressure sensor 19 is enhanced, and an erroneous diagnosis of the airflow meter and the intake pipe pressure sensor 19 are prevented.

In the present embodiment, it is determined whether both airflow meter 14 and the intake pipe pressure sensor 19 have malfunctions based on the ratio between the intake air amount detected by the airflow meter 14 and the intake air amount detected by the intake pipe pressure sensor 19. This determination can be done based on a difference between the intake air amount detected by the airflow meter 14 and the intake air amount detected by the intake pipe pressure sensor 19. Only one of the diagnosis of the airflow meter and the diagnosis of the intake pipe pressure sensor can be performed.

Fifth Embodiment

Figure 12:
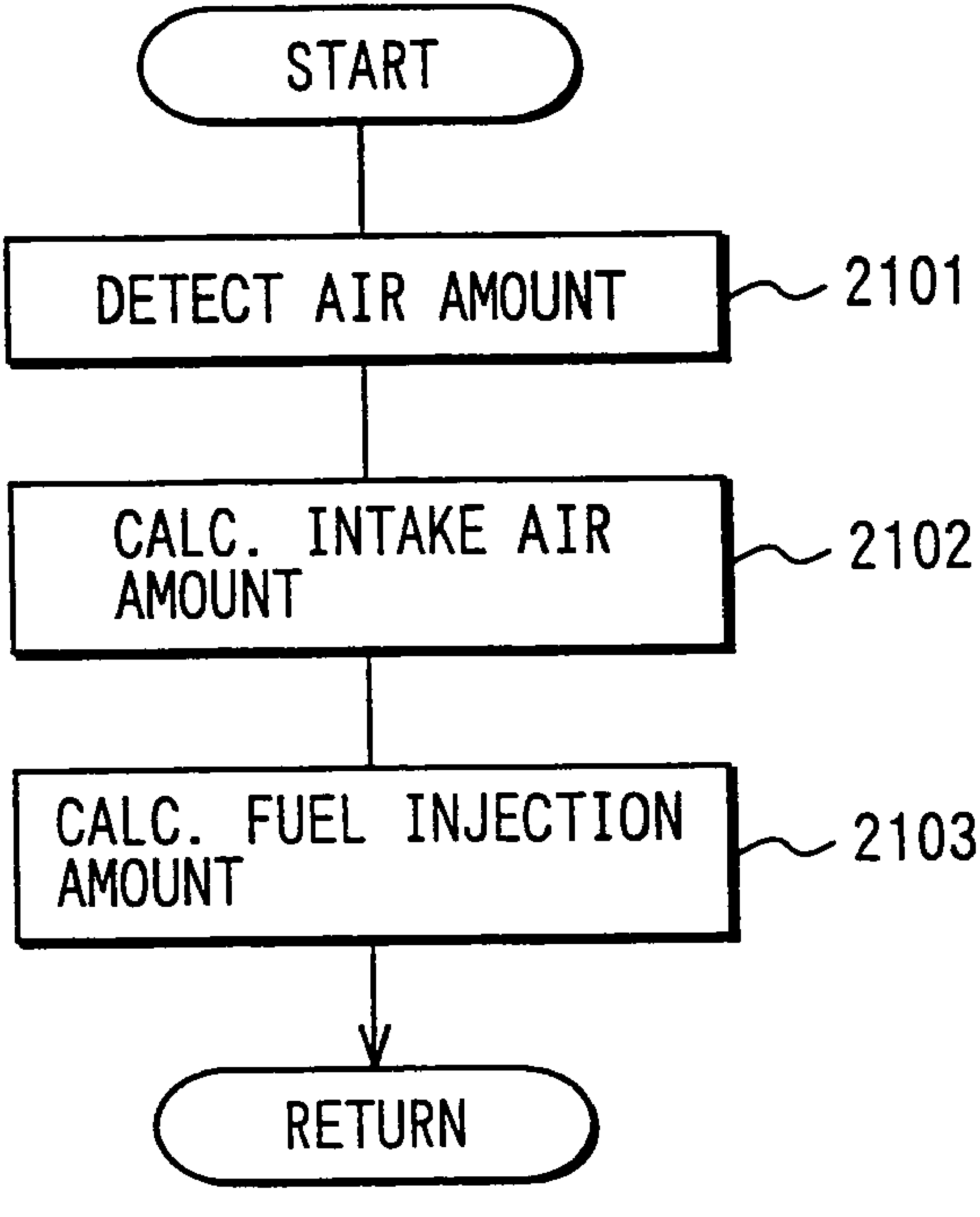
FIG. 12 is a flowchart showing a fuel injection amount calculation routine according to fifth embodiment.

The ECU 28 performs a fuel injection amount calculating program shown in FIG. 12 to determine the fuel injection amount based on the intake air amount detected by the airflow meter 14, which is referred to as a first intake air amount, so that a mass-flow fuel injection is conducted. The fuel injection amount calculating program is periodically performed while the engine is running. In step 2101, the computer reads the output from the airflow meter 14 to detect an air amount [g/s] passing through the airflow meter 14. In step 2102, the air amount is divided by the present engine speed [g/rev] to obtain the intake air amount [g/rev] per one revolution of the engine. In step 2103, the fuel injection amount is calculated based on the intake air amount [g/rev].

The ECU 28 performs the diagnosis of the airflow meter 14 and the intake pipe pressure sensor 19 by comparing the first intake air mount representing the intake air amount detected by the airflow meter 14, a second intake air amount representing the intake air amount calculated based on the intake pipe pressure detected by the intake pipe pressure sensor 19, and a third intake air amount representing the intake air amount calculated based on the air-fuel ratio detected by the air-fuel ratio sensor 24 and the fuel injection amount.

Figure 14:
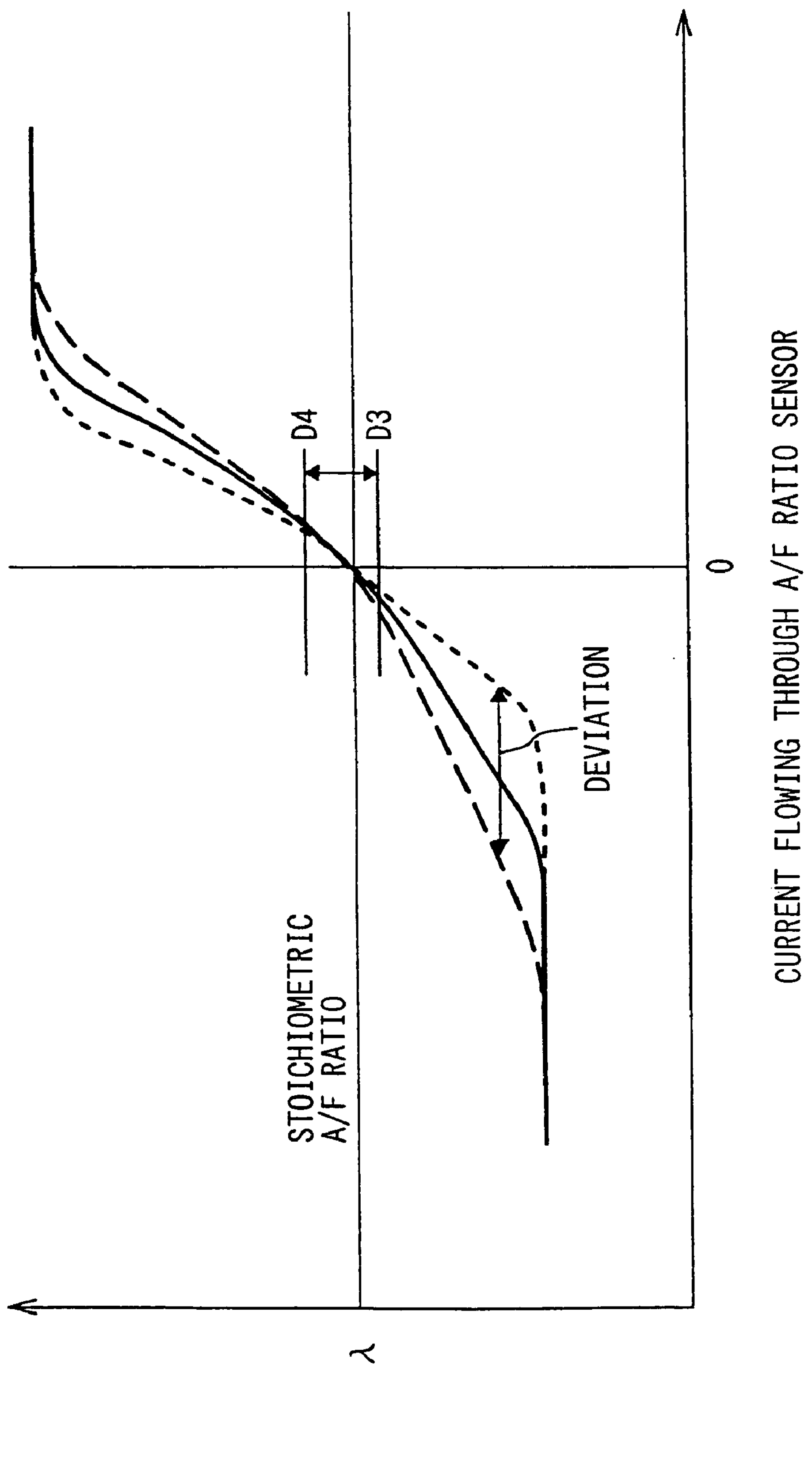
FIG. 14 is a graph for explaining a deviation of an air-fuel sensor detection characteristic.

In the mass-flow injection system, the fuel injection amount is determined based on the first intake air amount "MafLoad" detected by the airflow meter 14. If the airflow meter 14 is failed, the fuel injection amount increases to an abnormal value so that the air fuel ratio $\lambda$ of the exhaust gas is brought to out of the range, which is the range including a stoichiometric air-fuel ratio, as shown in FIG. 14. The detection error of the air-fuel ratio sensor 24 increases, so that the calculation error of the third intake air amount "EstLoad" is increased, whereby an erroneous determination of malfunction may be conducted. In FIG. 14, according as the air-fuel ratio λ is apart from the stoichiometric air-fuel ratio, a deviation of the characteristic of the air-fuel ratio sensor 24 increases.

In view of the forgoing matter, according to the fifth embodiment, it is determined whether the intake pipe pressure sensor 19 has a malfunction by comparing the second intake amount "MapLoad" and the third intake amount "EstLoad". When it is determined the intake pipe pressure sensor 19 is normal, it is determined whether the airflow meter has a malfunction by comparing the first intake air amount "MafLoad" and the second intake air amount "MapLoad". Thereby, after confirming the intake pipe pressure sensor 19 is normal, the diagnosis of the airflow meter 14 can be performed to correctly detect the malfunction of the airflow meter 14.

Besides, according to the fifth embodiment, when the condition in which the air-fuel ratio λ is out of the predetermined range has been kept for a predetermined period, it is determined whether the airflow meter 14 has a malfunction by comparing the first intake air amount "MafLoad" and the second intake air amount "MapLoad". That is, the computer determines that the airflow meter may have a malfunction, so that the diagnosis of the airflow meter 14 is performed without using the third intake air amount "EstLoad". Therefore, even if the third intake air amount "EstLoad" cannot be relied on, the malfunction of the airflow meter 14 can be detected.

Figure 13:
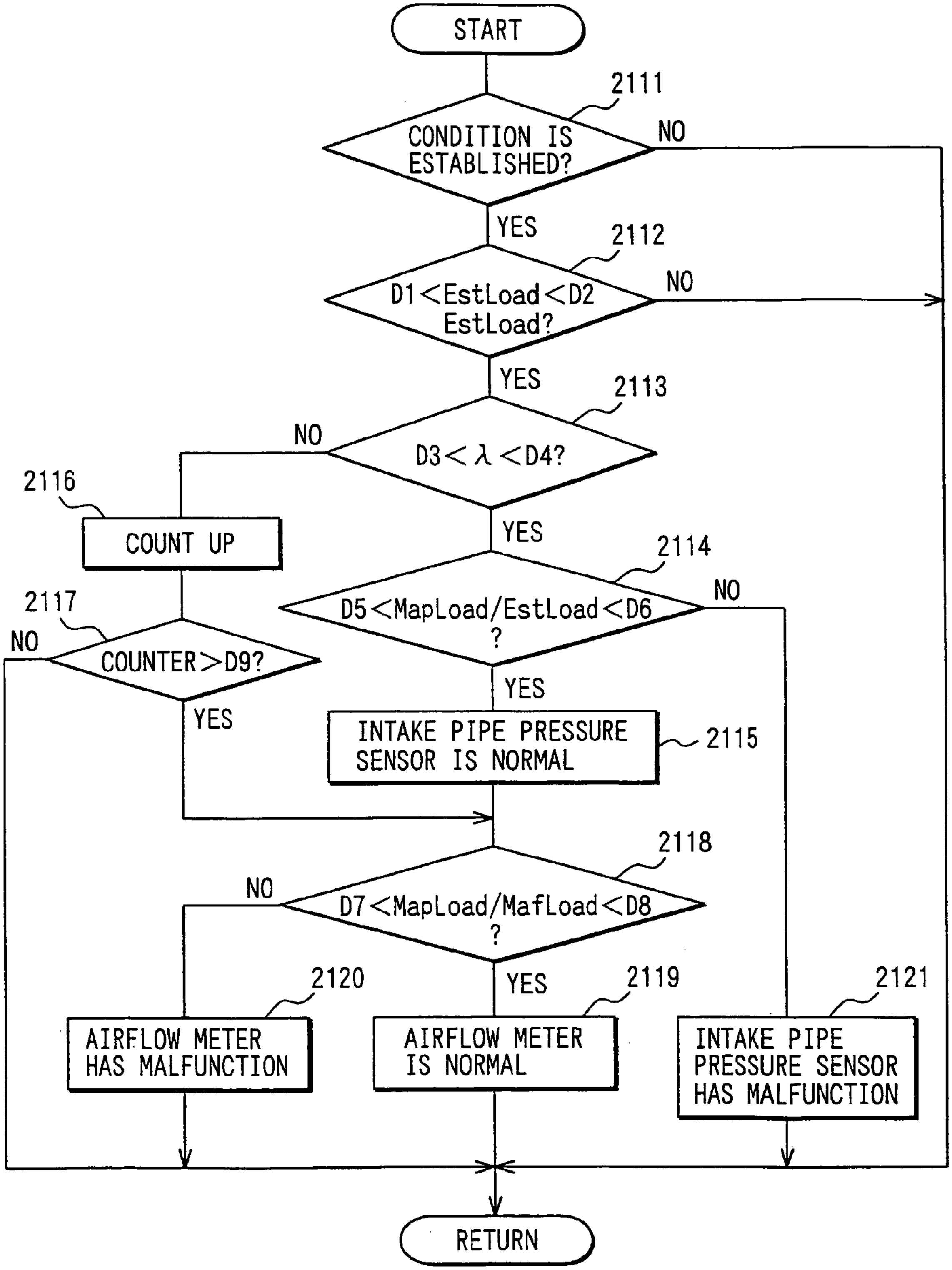
FIG. 13 is a flowchart showing an intake sensor diagnosis according to the fifth embodiment.

The diagnosis of the airflow meter 14 and the intake pipe pressure sensor 19 is performed based on the program shown in FIG. 13. The program is periodically performed while the engine is running and functions as a diagnosis means. In step 2111, the computer determines whether a diagnosis performing condition is established according to whether following four conditions are satisfied.

(1) The warm-up of the engine has finished.

(2) The engine is in stable condition.

(3) The engine speed is within a predetermined range, for example the range from a target idle speed to a pre-selected speed.

(4) The speed of the vehicle is under a pre-selected speed.

These conditions are necessary to keep the calculation accuracy of intake air amount "MafLoad", "MapLoad" and "EstLoad". If even one of conditions is not satisfied, the diagnosis performing condition is not established to end the routine.

When it is Yes in step 2111, the procedure proceeds to step 2112 in which the computer determines whether the third intake air amount "EstLoad" calculated based on the air-fuel ratio λ and the furl injection amount is within a predetermined range (D1<EstLoad<D2). When the third intake amount "EstLoad" is out of the range (EstLoad≦D1, or EstLoad≧D2), the computer determines the calculation accuracy of the third intake air amount "EstLoad" cannot be relied on to end the routine.

When the third intake amount "EstLoad" is within the range (D1<EstLoad<D2), the computer determines that the calculation accuracy of the third intake amount "EstLoad" is kept high. The procedure proceeds to step 2113 in which the computer determines whether the air-fuel ratio λ is within a predetermined range including the stoichiometric air-fuel ratio (D3<λ<D4). When it is Yes in step 2113, the procedure proceeds to step 2114. In step 2114, the computer determines whether the second intake air amount "MapLoad" substantially coincide with the third intake air amount "EstLoad" according to whether the ratio between the second intake amount and the third intake amount is within a predetermined range including "1" (D5<MapLoad/EstLoad<D6).

When it is determined that the ratio is out of the range (MapLoad/EstLoad≦D5, or MapLoad/EstLoad≧D6), the computer determines the second intake air amount "MapLoad" is abnormal value to advance step 2121 to determine the intake pipe pressure sensor 19 has malfunction. When the ratio is within the predetermined range (D5<MapLoad/EstLoad<D6), the computer determines that the second intake air amount "MapLoad" is substantially consistent with the third intake air amount "EstLoad" to advance step 2115 to determine the intake pipe pressure sensor is normal.

After determining the intake pipe pressure sensor 19 is normal, the procedure proceeds to step 2118 in which the computer determined whether the second intake air amount "MapLoad" is substantially consistent with the first intake air amount "MafLoad" according to whether the ratio between the second intake air amount and first intake air amount is within a predetermined range including "1" (D7<MapLoad/MafLoad<D8). When the computer determines the ratio is out of the range (MapLoad/MafLoad≦D7, or MapLoad/MafLoad≧D8), it determines the first intake air amount "MafLoad" is abnormal value to advance step 2120 to determine the airflow meter 14 has a malfunction. When the ratio is within the range, the computer determines the first intake air amount "MafLoad" is substantially consistent with the second intake air amount "MapLoad", which is confirmed as normal, to advance step 2119 to determine the airflow meter 14 is normal.

In step 2113, when the air-fuel ratio λ is out of the range (λ≦D3, or λ≧D4), the procedure proceeds to step 2116 in which a time counter "Counter" counts up a duration in which the air-fuel ratio λ is out of the range. In step 2117, the computer determines whether the count number of time counter "Counter" is larger than "D9". When it is No in step 2117, the procedure ends.

At the time when the number of time counter "Counter" exceeds "D9" in step 2117, the computer determines that the airflow meter 14 may have a malfunction. The procedure proceeds to step 2118 in which it is determined the ratio between the second intake air amount "MapLoad" and the first intake air amount "MafLoad" is within the predetermined range. When it is No in step 2118, the procedure proceeds to step 2120 to determine the airflow meter 14 has a malfunction.

Figure 15:
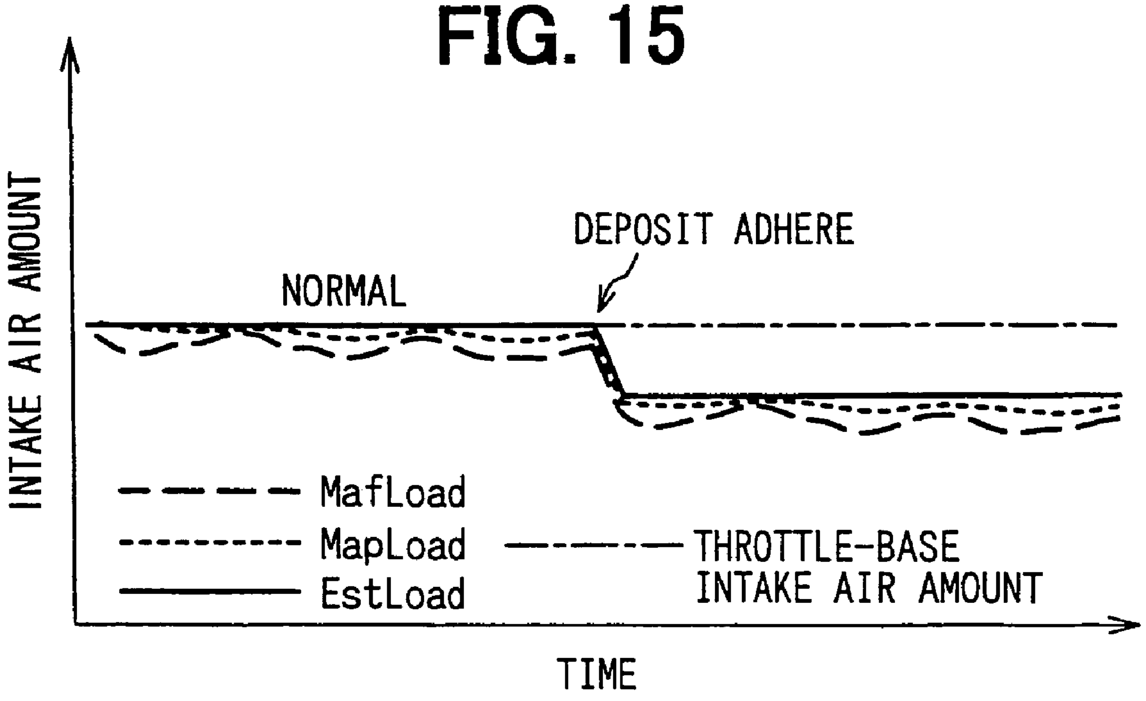
FIG. 15 is a time chart for explaining behaviors of intake air amounts in a case that a deposit adheres on a throttle valve.

FIG. 15 is a graph showing behaviors of the first to third intake air amount "MafLoad", "MapLoad" and "EstLoad" at the time when the deposit adheres on the throttle valve 16 to decrease the intake air amount. As shown in FIG. 15, the throttle-base intake air amount is constant even when the deposit is adhering on the throttle valve. In a diagnosis system performed based on the throttle-base intake air amount, an increment of deposit increases the calculation error of the throttle-base intake air amount to cause erroneous diagnosis in which a normal airflow meter 14 has a malfunction.

To the contrary, according to the fifth embodiment, the diagnosis of the airflow meter 14 and the intake pipe pressure sensor 19 is performed based on the first intake air amount, the second intake air amount, and the third intake air amount.

Figure 16A:
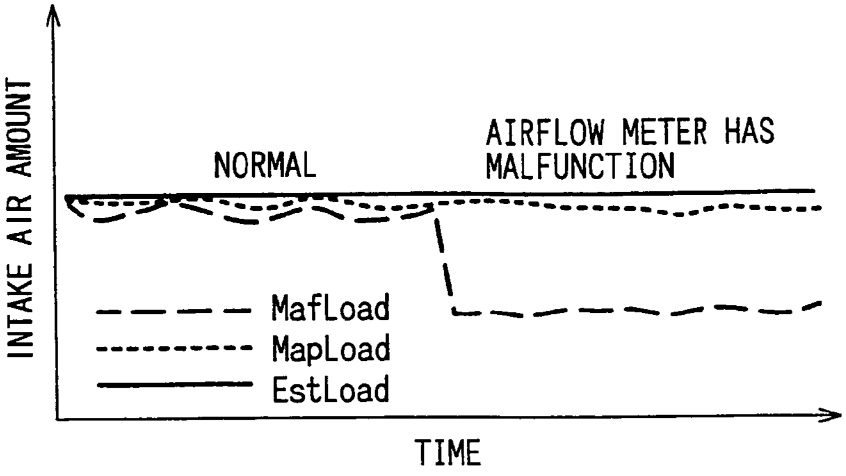
FIGS. 16A, 16B, and 16C are time charts for explaining intake air amounts in a case that an airflow meter has a malfunction.
Figure 16B:
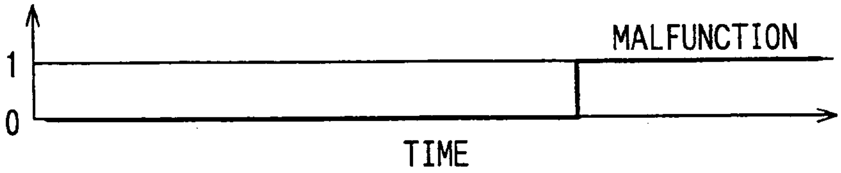
Figure 16C:
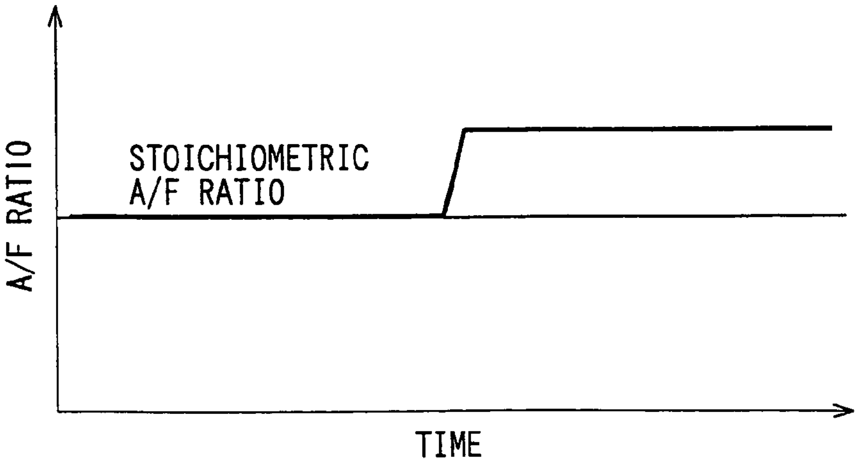

As shown in FIG. 16A, when the airflow meter has a malfunction, the second intake air amount "MapLoad" is substantially consistent with the third intake air amount "EstLoad", and the first intake air amount "MafLoad" deviates. Thereby, a malfunction of the airflow meter 14 is detected as shown in FIG. 16B. In the mass-flow system, when the airflow meter 14 has a malfunction, the fuel injection amount becomes abnormal value to deviate the air-fuel ratio from the stoichiometric air-fuel ratio as shown in FIG. 16C.

Figure 17A:
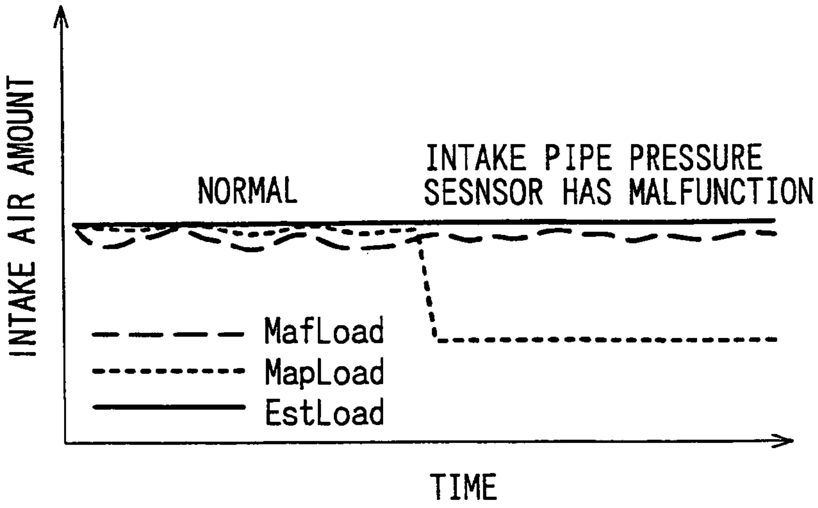
FIGS. 17A, 17B, and 17C are time charts for explaining intake air amounts in a case that an intake pipe pressure sensor has a malfunction.
Figure 17B:
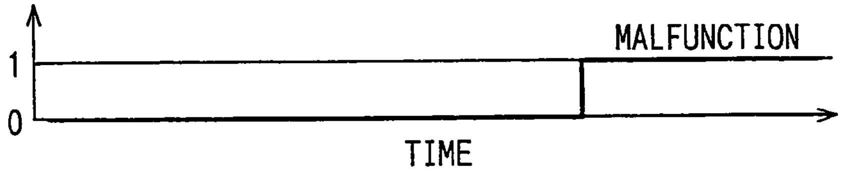
Figure 17C:
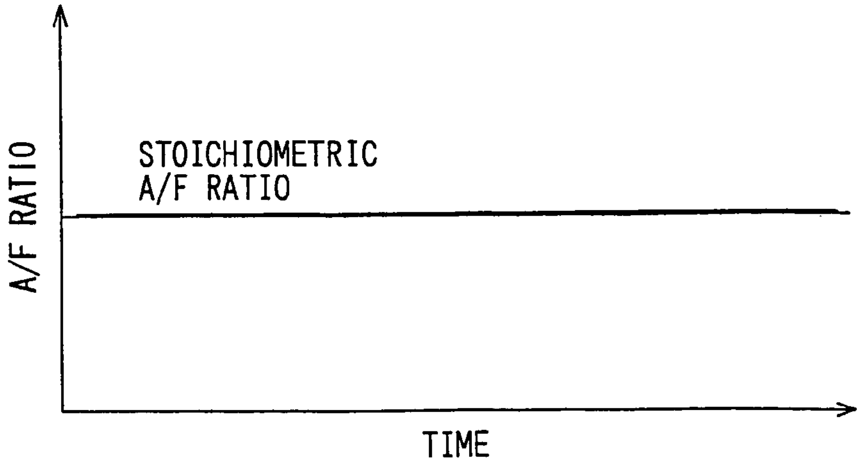

As shown in FIG. 17A, when the intake pipe pressure sensor 19 has a malfunction, the first intake air amount "MafLoad" is substantially consistent with the third intake air amount "EstLoad", and the second intake air amount "MapLoad" deviates. Thereby, a malfunction of the intake pipe pressure sensor 19 is detected as shown in FIG. 17B. In the mass-flow system, even if the intake pipe pressure sensor 19 has a malfunction, the fuel injection amount is determined based on the first intake air amount so that the air-fuel ratio is controlled around the stoichiometric air-fuel ratio as shown in FIG. 17C.

As described above, according to the fifth embodiment, since the diagnosis of the airflow meter 14 and the intake pipe pressure sensor 19 can be performed not using the throttle-base intake air amount, the erroneous diagnosis of the airflow meter 14 and the intake pipe pressure sensor 19 due to the deposit on the throttle valve can be prevented so that the reliability of the diagnosis is enhanced.

Sixth Embodiment

Figure 18:
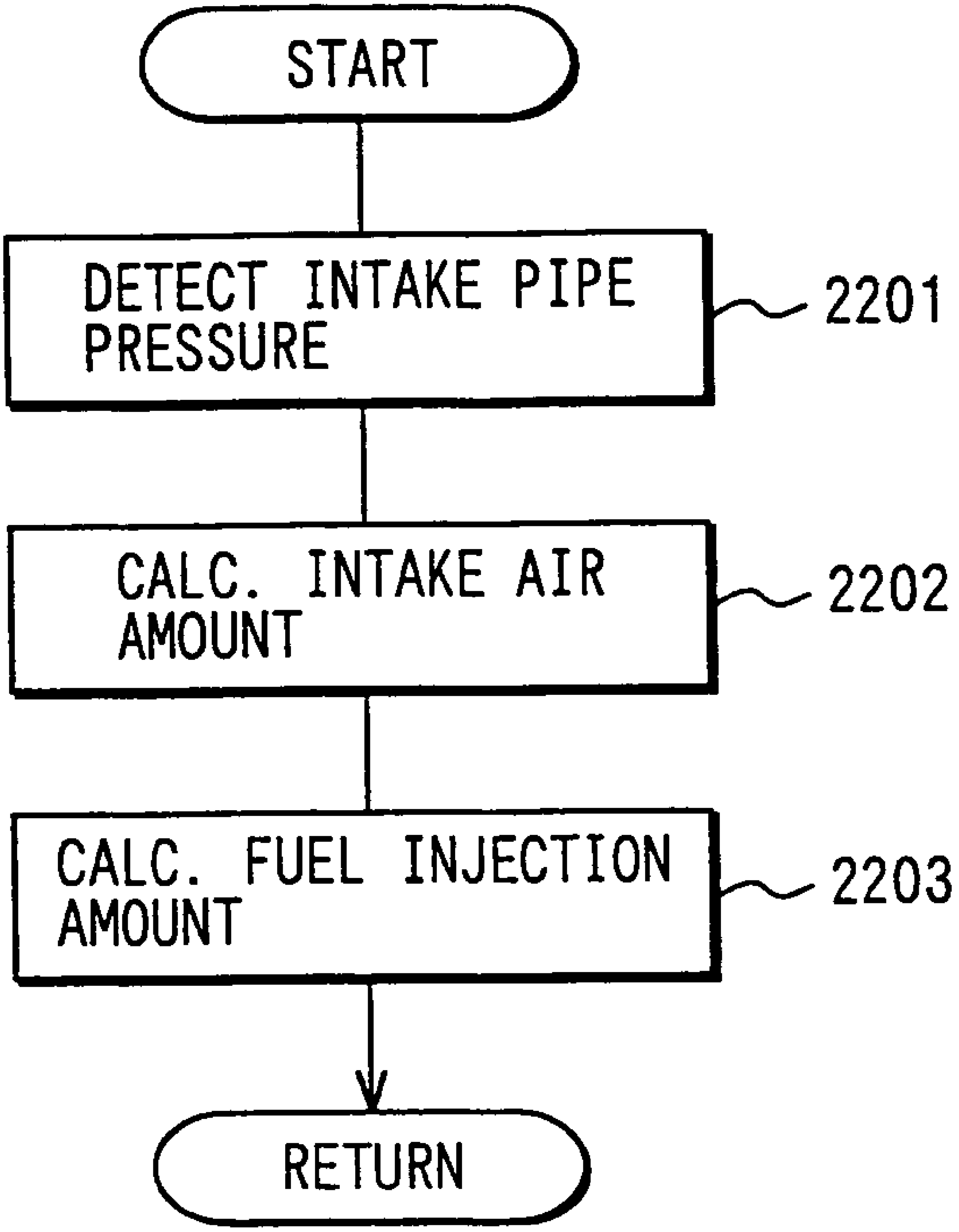
FIG. 18 is a flowchart showing a fuel injection calculating routine according to a sixth embodiment.
Figure 19:
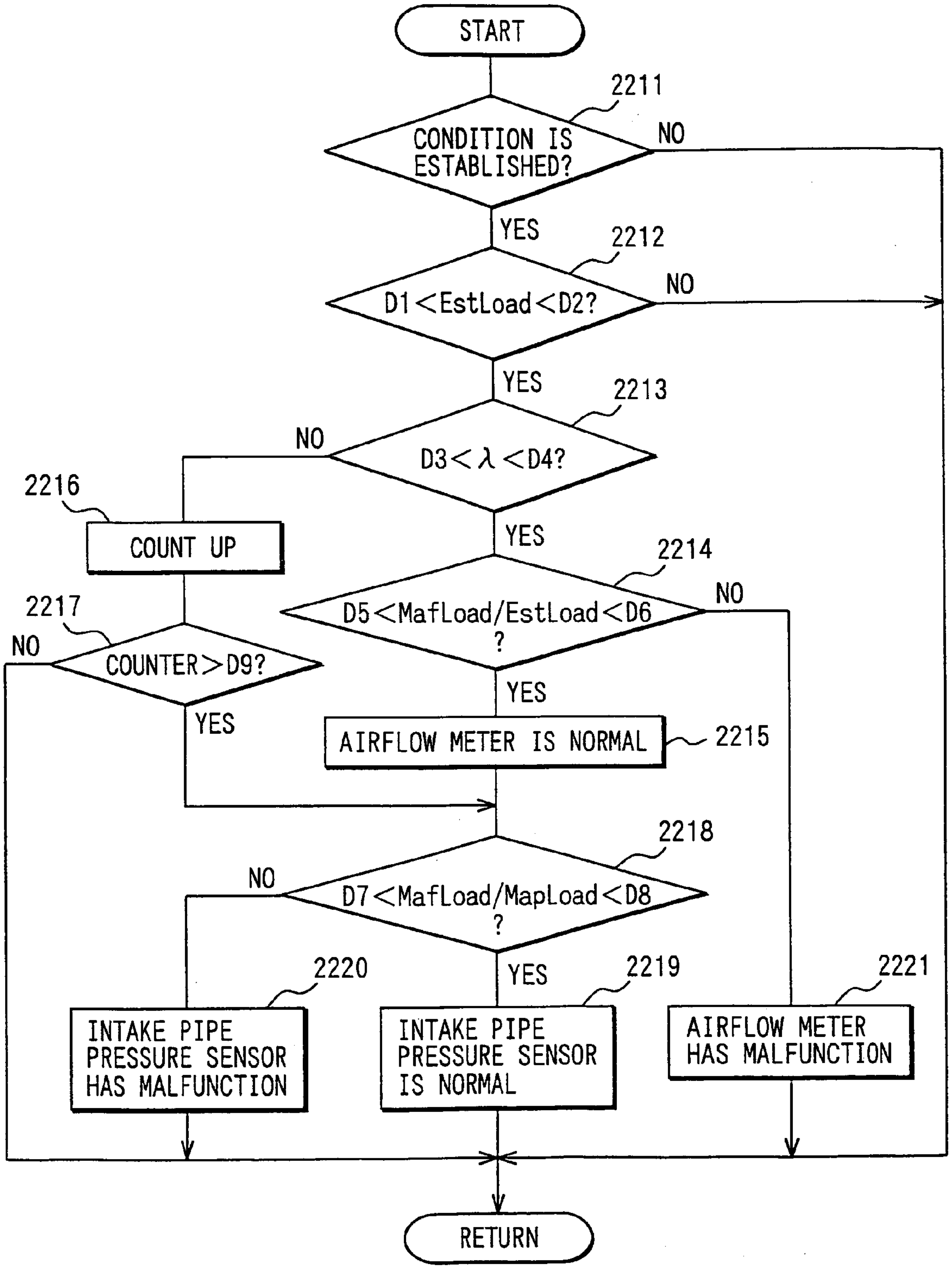
FIG. 19 is a flowchart showing an intake sensor diagnosis according to the sixth embodiment.

Referring to FIGS. 18 and 19, the sixth embodiment is described hereinafter. The fuel injection amount is determined base on the intake air amount (the second intake air amount) calculated based on the output from the intake pipe pressure sensor 19. This system is referred to as a speed density system.

In the speed density system, the fuel injection amount is determined based on the second intake air amount "MapLoad" by performing a program shown in FIG. 18. The program shown in FIG. 18 is periodically performed while the engine is running. In step 2201, the intake pipe pressure [Pa] is detected based on the output from the intake pipe pressure sensor 19. In step 2202, the intake air amount [g/rev] per one revolution of the engine is calculated based on the intake pipe pressure [Pa]. In step 2203, a fuel injection amount is calculated based on the intake air amount [g/rev].

In the speed density system, the fuel injection amount is determined based on the second intake air amount "MapLoad" detected by the intake pipe pressure sensor 19. If the intake pipe pressure sensor 19 is failed, the fuel injection amount increases to an abnormal value so that the air fuel ratio $\lambda$ of the exhaust gas is brought to out of the range, which is the range including the stoichiometric air-fuel ratio, as shown in FIG. 14. The detection error of the air-fuel ratio sensor 24 increases, so that the calculation error of the third intake air amount "EstLoad" is increased, whereby an erroneous determination of malfunction may be conducted.

In view of the forgoing matter, according to the sixth embodiment, it is determined whether the airflow meter 14 has a malfunction by comparing the first intake amount "MafLoad" and the second intake amount "MapLoad". When it is determined the airflow meter 14 is normal, it is determined whether the intake pipe pressure sensor 19 has a malfunction by comparing the first intake air amount "MafLoad" and the second intake air amount "MapLoad". Thereby, after confirming the airflow meter 14 is normal, the diagnosis of the intake pipe pressure sensor 19 can be performed to correctly detect the malfunction of the intake pipe pressure sensor 19.

Besides, according to the sixth embodiment, when the condition in which the air-fuel ratio $\lambda$ is out of the predetermined range has been kept for a predetermined period, it is determined whether the intake pipe pressure sensor 19 has a malfunction by comparing the first intake air amount "MafLoad" and the second intake air amount "MapLoad". That is, the computer determines that the intake pipe pressure sensor 19 may have a malfunction, so that the diagnosis of the intake pipe pressure sensor 19 is performed without using the third intake air amount "EstLoad". Therefore, even if the third intake air amount "EstLoad" cannot be relied on, the malfunction of the intake pipe pressure sensor 19 can be detected.

The diagnosis of the airflow meter 14 and the intake pipe pressure sensor 19 is performed based on the program shown in FIG. 19. The program is periodically performed while the engine is running and functions as a diagnosis means. In step 2211, the computer determines whether a diagnosis performing condition is established according to whether following four conditions are satisfied.

(1) The warm-up of the engine has finished.

(2) The engine is in stable condition.

(3) The engine speed is within a predetermined range, for example the range from a target idle speed to a pre-selected speed.

(4) The speed of the vehicle is under a pre-selected speed.

These conditions are necessary to keep the calculation accuracy of intake air amount "MafLoad", "MapLoad" and "EstLoad". If even one of conditions is not satisfied, the diagnosis performing condition is not established to end the routine.

When it is Yes in step 2211, the procedure proceeds to step 2212 in which the computer determines whether the third intake air amount "EstLoad" calculated based on the air-fuel ratio $\lambda$ and the furl injection amount is within a predetermined range (D1<EstLoad<D2). When the third intake amount "EstLoad" is out of the range (EstLoad≦D1, or EstLoad≧D2), the computer determines the calculation accuracy of the third intake air amount "EstLoad" cannot be relied on to end the routine.

When the third intake amount "EstLoad" is within the range (D1<EstLoad<D2), the computer determines that the calculation accuracy of the third intake amount "EstLoad" is kept high. The procedure proceeds to step 2213 in which the computer determines whether the air-fuel ratio $\lambda$ is within a predetermined range including the stoichiometric air-fuel ratio (D3<$\lambda$<D4). When it is Yes in step 2213, the procedure proceeds to step 2214. In step 2214, the computer determines whether the first intake air amount "MafLoad" substantially coincide with the third intake air amount "EstLoad" according to whether the ratio between the first intake amount and the third intake amount is within a predetermined range including "1" (D5<MafLoad/EstLoad<D6).

When it is determined that the ratio is out of the range (MafLoad/EstLoad≦D5, or MafLoad/EstLoad≧D6), the computer determines the first intake air amount "MafLoad" is abnormal value to advance step 2221 to determine the airflow meter 14 has malfunction. When the ratio is within the predetermined range (D5<MafLoad/EstLoad<D6), the computer determines that the first intake air amount "MafLoad" is substantially consistent with the third intake air amount "EstLoad" to advance step 2215 to determine the intake pipe pressure sensor is normal.

After determining the airflow meter 14 is normal, the procedure proceeds to step 2218 in which the computer determined whether the first intake air amount "MafLoad" is substantially consistent with the second intake air amount "MapLoad" according to whether the ratio between the first intake air amount and second intake air amount is within a predetermined range including "1" (D7<MafLoad/MapLoad<D8). When the computer determines the ratio is out of the range (MafLoad/MapLoad≦D7, or MafLoad/

MapLoad≧D8), it determines the second intake air amount “MapLoad” is abnormal value to advance step 2220 to determine the intake pipe pressure sensor 19 has a malfunction. When the ratio is within the range, the computer determines the second intake air amount “MapLoad” is substantially consistent with the first intake air amount “MafLoad”, which is confirmed as normal, to advance step 2219 to determine the intake pipe pressure sensor 19 is normal.

In step 2213, when the air-fuel ratio λ is out of the range (λ≦D3, or λ≧D4), the procedure proceeds to step 2216 in which a time counter “Counter” counts up a duration in which the air-fuel ratio λ is out of the range. In step 2217, the computer determines whether the count number of time counter “Counter” is larger than “D9”. When it is No in step 2217, the procedure ends.

At the time when the number of time counter “Counter” exceeds “D9” in step 2217, the computer determines that the intake pipe pressure sensor 19 may have a malfunction. The procedure proceeds to step 2218 in which it is determined the ratio between the first intake air amount “MafLoad” and the second intake air amount “MapLoad” is within the predetermined range. When it is No in step 2218, the procedure proceeds to step 2220 to determine the intake pipe pressure sensor 19 has a malfunction.

As described above, in the speed density system according to the sixth embodiment, since the diagnosis of the airflow meter 14 and the intake pipe pressure sensor 19 can be performed not using the throttle-base intake air amount, the erroneous diagnosis of the airflow meter 14 and the intake pipe pressure sensor 19 due to the deposit on the throttle valve 16 can be prevented so that the reliability of the diagnosis is enhanced.

What is claimed is:

1. A diagnosis apparatus for intake sensors, comprising:

an intake air amount sensor detecting an amount of intake air of an internal combustion engine;

an intake pipe pressure sensor detecting an intake pipe pressure;

an air-fuel ratio sensor detecting air-fuel ratio in an exhaust gas; and a computer for performing a diagnosis of the intake air amount sensor and/or the intake pipe pressure sensor, wherein the computer is configured to perform the diagnosis based on a first intake air amount representing an intake air amount detected by the intake air amount sensor, a second intake air amount representing an intake air amount calculated based on an intake pipe pressure detected by the intake pipe pressure sensor, and a third intake air amount representing an intake air amount calculated based on the air-fuel ratio and a fuel injection amount;

the fuel injection amount is determined based on the first intake air amount, and the computer performs the diagnosis of the intake pipe pressure sensor by comparing the second intake air amount with the third intake air amount, and performs a diagnosis of the intake air amount sensor by comparing the first intake air amount with the second intake air amount when the intake pipe pressure sensor is determined as operating in a predetermined manner.

2. A diagnosis apparatus for intake sensors, comprising:

an intake air amount sensor detecting an amount of intake air of an internal combustion engine;

an intake pipe pressure sensor detecting an intake pipe pressure;

an air-fuel ratio sensor detecting air-fuel ratio in an exhaust gas; and a computer for performing a diagnosis of the intake air amount sensor and/or the intake pipe pressure sensor, wherein the computer is configured to perform the diagnosis based on a first intake air amount representing an intake air amount detected by the intake air amount sensor, a second intake air amount representing an intake air amount calculated based on an intake pipe pressure detected by the intake pipe pressure sensor, and a third intake air amount representing an intake air amount calculated based on the air-fuel ratio and a fuel injection amount;

the fuel injection amount is determined based on the first intake air amount, and the computer performs the diagnosis of the intake air amount sensor by comparing the first intake air amount with the second intake air amount when a condition in which the air-fuel ratio is out of a predetermined range has been kept for a predetermined time period.

3. A diagnosis apparatus for intake sensors, comprising:

an intake air amount sensor detecting an amount of intake air of an internal combustion engine;

an intake pipe pressure sensor detecting an intake pipe pressure;

an air-fuel ratio sensor detecting air-fuel ratio in an exhaust gas; and a computer for performing a diagnosis of the intake air amount sensor and/or the intake pipe pressure sensor, wherein the computer is configured to perform the diagnosis based on a first intake air amount representing an intake air amount detected by the intake air amount sensor, a second intake air amount representing an intake air amount calculated based on an intake pipe pressure detected by the intake pipe pressure sensor, and a third intake air amount representing an intake air amount calculated based on the air-fuel ratio and a fuel injection amount;

the fuel injection amount is determined based on the second intake air amount, and the computer performs the diagnosis of the intake air amount sensor by comparing the first intake air amount with the third intake air amount, and performs a diagnosis of the intake pipe pressure sensor by comparing the first intake air amount with the second intake air amount when the intake air amount sensor is determined as normal.

4. A diagnosis apparatus for intake sensors, comprising:

an intake air amount sensor detecting an amount of intake air of an internal combustion engine;

an intake pipe pressure sensor detecting an intake pipe pressure;

an air-fuel ratio sensor detecting air-fuel ratio in an exhaust gas; and a computer for performing a diagnosis of the intake air amount sensor and/or the intake pipe pressure sensor, wherein the computer is configured to perform the diagnosis based on a first intake air amount representing an intake air amount detected by the intake air amount sensor, a second intake air amount representing an intake air amount calculated based on an intake pipe pressure detected by the intake pipe pressure sensor, and a third intake air amount representing an intake air amount calculated based on the air-fuel ratio and a fuel injection amount;

the fuel injection amount is determined based on the second intake air amount, and the computer performs the diagnosis of the intake pipe pressure sensor by comparing the first intake air amount with the second intake air amount when a condition in which the air-fuel ratio is out of a predetermined range has been kept for a predetermined time period.

5. A diagnosis apparatus for intake sensors, comprising:

an intake air amount sensor detecting an amount of intake air of an internal combustion engine;

an intake pipe pressure sensor detecting an intake pipe pressure;

an air-fuel ratio sensor detecting air-fuel ratio in an exhaust gas; and a computer for performing a diagnosis of the intake air amount sensor and/or the intake pipe pressure sensor, wherein the computer is configured to perform the diagnosis based on a first intake air amount representing an intake air amount detected by the intake air amount sensor, a second intake air amount representing an intake air amount calculated based on an intake pipe pressure detected by the intake pipe pressure sensor, and a third intake air amount representing an intake air amount calculated based on the air-fuel ratio and a fuel injection amount;

the computer prohibits performing the diagnosis of the intake air amount sensor and/or a intake pipe pressure sensor when the second intake air amount and the third intake air amount are smaller than a predetermined value.

* * * * *